United States Patent
Kabalnov et al.

(10) Patent No.: US 10,434,709 B2
(45) Date of Patent: Oct. 8, 2019

(54) THREE-DIMENSIONAL (3D) PRINTING

(71) Applicant: Hewlett-Packard Development Company, L.P., Houston, TX (US)

(72) Inventors: Alexey S. Kabalnov, San Diego, CA (US); Jacob Tyler Wright, San Diego, CA (US); Vladek Kasperchik, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 274 days.

(21) Appl. No.: 15/547,007

(22) PCT Filed: Apr. 27, 2015

(86) PCT No.: PCT/US2015/027829
§ 371 (c)(1),
(2) Date: Jul. 27, 2017

(87) PCT Pub. No.: WO2016/175748
PCT Pub. Date: Nov. 3, 2016

(65) Prior Publication Data
US 2018/0015664 A1 Jan. 18, 2018

(51) Int. Cl.
*B29C 64/165* (2017.01)
*B29C 64/112* (2017.01)
(Continued)

(52) U.S. Cl.
CPC .......... *B29C 64/165* (2017.08); *B29C 64/112* (2017.08); *B29C 64/291* (2017.08);
(Continued)

(58) Field of Classification Search
CPC ... B29C 64/165; B29C 64/291; B29C 64/112; B33Y 30/00; B33Y 10/00; B33Y 70/00;
(Continued)

(56) References Cited

U.S. PATENT DOCUMENTS 7,991,498 B2    8/2011   Kritchman
2004/0080078 A1 4/2004   Collins
(Continued)

FOREIGN PATENT DOCUMENTS

CA   2616436   6/2009
CN   1488508   4/2004
(Continued)

OTHER PUBLICATIONS

International Search Report and Written Opinion for International Application No. PCT/US2015/027829 dated Dec. 22, 2015, 9 pages.

*Primary Examiner* — Robert J Grun
(74) *Attorney, Agent, or Firm* — Dierker & Kavanaugh PC

(57) ABSTRACT

In a 3D printing method example, color is added to a part. A build material is applied, and is pre-heated to a temperature ranging from about 50 C to about 400 C. A black ink, including an infrared absorbing colorant, is selectively applied on at least a portion of the build material. A white ink, including a white colorant that is opaque in visible wavelengths and is transparent to infrared wavelengths, is selectively applied on the black ink. A colored ink, including a colorant having a color other than black or white, is selectively applied on the white ink. The build material and the applied inks are then exposed to infrared radiation. The black ink at least partially fuses the portion of the build material in contact therewith. At least some of the white colorant and the colorant are embedded in the at least partially fused portion at a surface thereof.

15 Claims, 13 Drawing Sheets

(51) Int. Cl.
*B29C 64/291* (2017.01)
*B33Y 10/00* (2015.01)
*B33Y 30/00* (2015.01)
*B41M 3/00* (2006.01)
*B41M 5/00* (2006.01)
*B29K 77/00* (2006.01)
*B33Y 70/00* (2015.01)

(52) U.S. Cl.
CPC ............ *B33Y 10/00* (2014.12); *B33Y 30/00* (2014.12); *B41M 3/00* (2013.01); *B41M 5/0088* (2013.01); *B29K 2077/00* (2013.01); *B29K 2995/0021* (2013.01); *B33Y 70/00* (2014.12)

(58) Field of Classification Search
CPC ............... B41M 3/00; B41M 5/0088; B29K 2995/0021; B29K 2077/00
See application file for complete search history.

(56) References Cited

U.S. PATENT DOCUMENTS

| | | |
|---|---|---|
| 2005/0053798 A1 | 3/2005 | Maekawa et al. |
| 2007/0238056 A1 | 10/2007 | Baumann et al. |
| 2012/0218338 A1 | 8/2012 | Kanamura et al. |
| 2014/0290508 A1 | 10/2014 | Shaul et al. |

FOREIGN PATENT DOCUMENTS

| | | |
|---|---|---|
| CN | 104085107 | 10/2014 |
| EP | 1252867 | 10/2002 |
| EP | 1491322 | 12/2004 |
| EP | 1661690 | 5/2006 |
| JP | 2000246804 | 9/2000 |
| JP | 2000280357 | 10/2000 |
| JP | 2001354877 | 12/2001 |
| WO | WO97/03887 | 2/1997 |
| WO | WO2004/096514 | 11/2004 |

THREE-DIMENSIONAL (3D) PRINTING

BACKGROUND

Three-dimensional (3D) printing may be an additive printing process used to make three-dimensional solid parts from a digital model. 3D printing is often used in rapid product prototyping, mold generation, and mold master generation. Some 3D printing techniques are considered additive processes because they involve the application of successive layers of material. This is unlike traditional machining processes, which often rely upon the removal of material to create the final part. Materials used in 3D printing often require curing or fusing, which for some materials may be accomplished using heat-assisted extrusion or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the three-dimensional (3D) printing method disclosed herein utilize Multi Jet Fusion (MJP). During multi jet fusion, an entire layer of a build material (also referred to as build material particles) is exposed to radiation, but a selected region (in some instances less than the entire layer) of the build material is fused and hardened to become a layer of a 3D part. In the examples disclosed herein, a fusing agent (also referred to herein as the black ink) is selectively deposited in contact with the selected region of the build material. The fusing agent(s) is capable of penetrating into the layer of the build material and spreading onto the exterior surface of the build material. This fusing agent is capable of absorbing radiation and converting the absorbed radiation to thermal energy, which in turn melts or sinters the build material that is in contact with the black ink. This causes the build material to fuse, bind, cure, etc. to form the layer of the 3D part.

In some instances, it has been found that the thermal energy may propagate into surrounding build material. This may result in the subsequent solidification of area(s)/portion(s) of the build material that were not exposed to the black ink. Examples of the method disclosed herein utilize the thermal energy propagation to add color to the layer and/or part that is formed. In some examples of the method, either before or after radiation exposure, a white ink and a colored ink may be applied adjacent to the black ink applied on the build material. In some other examples, before radiation exposure, the colored ink and the white ink may be applied to the build material, and then the black ink may be applied on the build material. In any of the example methods, as a result of radiation exposure and thermal energy generation, the black ink fuses the build material in contact therewith. Also in any of the example methods, as a result of thermal energy propagation, build material adjacent to (but not directly exposed to) the black ink may at least partially fuse. The colorant from the white ink and the colorant from the colored ink may become embedded in, or infuse into this at least partially fused portion.

Figure 1:
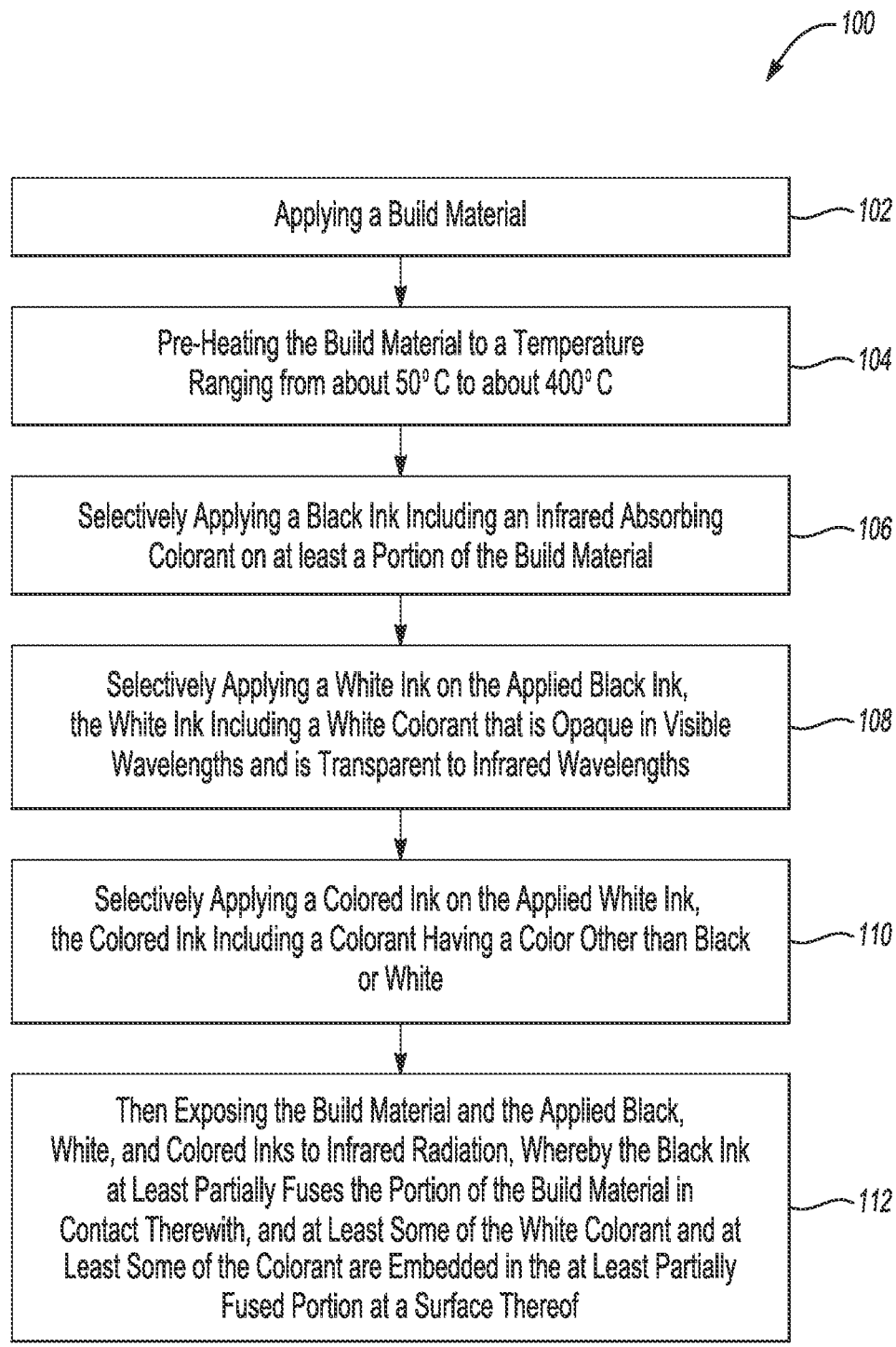
FIG. 1 is a flow diagram illustrating an example of a 3D printing method disclosed herein.

An example of the 3D printing method 100 is depicted in FIG. 1. It is to be understood that the method 100 shown in FIG. 1 will be discussed in detail herein, and in some instances, FIGS. 2A through 2E, FIG. 5, and FIG. 6 will be discussed in conjunction with FIG. 1. As an example, the method 100 may be used to apply color to the top of a layer or part that is being formed.

As shown at reference numeral 102, the method 100 includes applying a build material powder. An example of reference numeral 102 is shown in cross-section at FIG. 2A. In the example shown in FIG. 2A, one layer 10 of the build material 16 has been applied, as will be discussed in more detail below.

The build material 16 may be a powder, a liquid, a paste, or a gel. It is to be understood that the build material 16 is not a thermal expansion material and does not include a thermal expansion material. A thermal expansion material increases in size when exposed to heat. Rather, the build material 16 has an original material density that is substantially maintained after radiation exposure. By "substantially maintained," it is meant that after the build material 16 is fused, the after fusing density (of the layer, part, etc. formed from the build material 16) is within 10% of the original material density. For example, nylon particles (not the flowing powder, but the particles) may have a pre-fusing density of about 1.01 g/cm$^3$, and the layer, part, etc. formed from the nylon particles has an after fusing density ranging from about 0.9 g/cm$^3$ to about 1.01 g/cm$^3$. A substantially maintained density before and after fusing means that the warping of the resulting layer, part, etc. is reduced or eliminated.

Examples of build material 16 include semi-crystalline thermoplastic materials with a wide processing window of greater than 5° C. (i.e., the temperature range between the melting point and the re-crystallization temperature. Some specific examples of the build material 16 include polyamides (PAs) (e.g., PA 11/nylon 11, PA 12/nylon 12, PA 6/nylon 6, PA 8/nylon 8, PA 9 / nylon 9, PA 66/nylon 66, PA 612/nylon 612, PA 812 / nylon 812, PA 912/nylon 912, etc.). Other specific examples of the build material 16 include polyethylene, polyethylene terephthalate (PET), and an amorphous variation of these materials. Still other examples of suitable build materials 16 include polystyrene, polyacetals, polypropylene, polycarbonate, polyester, thermal polyurethanes, other engineering plastics, and blends of any two or more of the polymers listed herein. Core shell polymer particles of these materials may also be used.

The build material 16 may have a melting point ranging from about 50° C. to about 400° C. As examples, the build material 16 may be a polyamide having a melting point of 180° C., or thermal polyurethanes having a melting point ranging from about 100° C. to about 165° C.

The build material 16 may be made up of similarly sized particles or differently sized particles. In the examples shown herein, the build material 16 includes particles of two different sizes. The term "size", as used herein with regard to the build material 16, refers to the diameter of a spherical particle, or the average diameter of a non-spherical particle (i.e., the average of multiple diameters across the particle). In an example, the average size of the particles of the build material 16 ranges from 5 µm to about 100 µm.

It is to be understood that build material 16 may include, in addition to polymer particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 16.

Flow aid(s) may be added to improve the coating flowability of the build material 16. Flow aid(s) may be particularly beneficial when the particles of the build material 16 are less than 25 µm in size. The flow aid improves the flowability of the build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), or polydimethylsiloxane (E900). In an example, the flow aid is added in an amount ranging from greater than 0 wt % to less than 5 wt % based upon the total wt % of the build material 16.

Figure 2A:
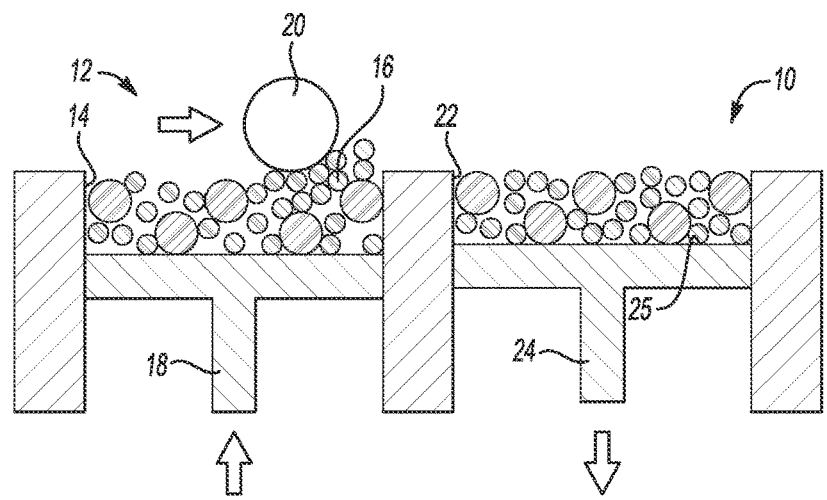
FIGS. 2A through 2E are semi-schematic, cross-sectional views depicting the example 3D printing method of FIG. 1.

In the example shown in FIG. 2A, a printing system 12 for forming the 3D part includes a supply bed 14 (including a supply of the build material 16), a delivery piston 18, a roller 20, a fabrication bed 22 (having a contact surface 25), and a fabrication piston 24. Each of these physical elements may be operatively connected to a central processing unit (not shown) of the printing system 12. The central processing unit (e.g., running computer readable instructions stored on a non-transitory, tangible computer readable storage medium) manipulates and transforms data represented as physical (electronic) quantities within the printer's registers and memories in order to control the physical elements to create the 3D part. The data for the selective delivery of the build material 16, the black ink, etc. may be derived from a model of the 3D part to be formed. As an example, the central processing unit may be a microprocessor-based controller that is coupled to a memory, for example via a communications bus (not shown). The memory stores the computer readable instructions. The central processing unit may execute the instructions, and thus may control operation of the system 12 in accordance with the instructions.

The delivery piston 18 and the fabrication piston 24 may be the same type of piston, but are programmed to move in opposite directions. In an example, when a layer of the 3D part is to be formed, the delivery piston 18 may be programmed to push a predetermined amount of the build material 16 out of the opening in the supply bed 14 and the fabrication piston 24 may be programmed to move in the opposite direction of the delivery piston 18 in order to increase the depth of the fabrication bed 22. The delivery piston 18 will advance enough so that when the roller 20 pushes the build material 16 into the fabrication bed 22 and onto the contact surface 25, the depth of the fabrication bed 22 is sufficient so that a layer 10 of the build material 16 may be formed in the bed 22. The roller 20 is capable of spreading the build material 16 into the fabrication bed 22 to form the layer 10, which is relatively uniform in thickness. In an example, the thickness of the layer 10 ranges from about 90 µm to about 110 µm, although thinner or thicker layers may also be used. For example, the thickness of the layer 10 may range from about 50 µm to about 200 µm.

It is to be understood that the roller 20 may be replaced by other tools, such as a blade that may be useful for spreading different types of powders, or a combination of a roller and a blade.

Figure 2B:
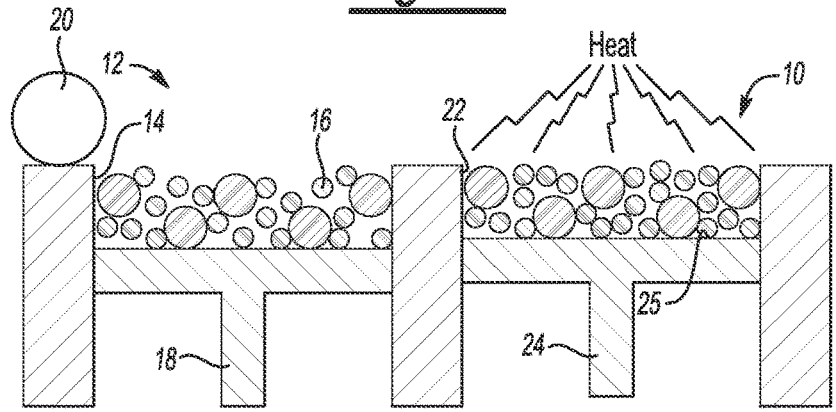

After the layer 10 of the build material 16 is applied in the fabrication bed 22, the layer 10 is exposed to heating (as shown at reference number 104 in FIG. 1 and in FIG. 2B). Heating is performed to pre-heat the build material 16, and thus the heating temperature may be below the melting point of the build material 16. As such, the temperature selected will depend upon the build material 16 that is used. As examples, the heating temperature may be from about 5° C. to about 50° C. below the melting point of the build material 16. In an example, the heating temperature ranges from about 50° C. to about 400° C. In another example, the heating temperature ranges from about 150° C. to about 170° C.

Pre-heating the layer 10 of the build material 16 may be accomplished using any suitable heat source that exposes all of the build material 16 in the fabrication bed 22 to the heat. Examples of the heat source include a thermal heat source or an electromagnetic radiation source (e.g., infrared (IR), microwave, etc.).

Figure 2C:
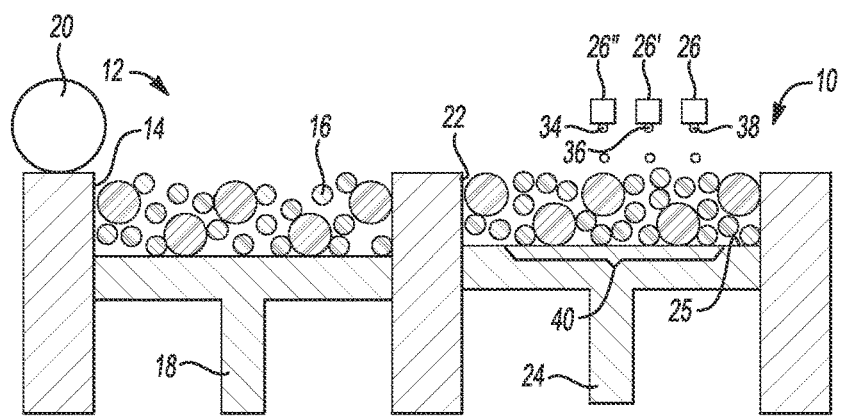

After pre-heating the layer 10, the black ink 38 may be selectively applied on at least a portion 40 of the build material 16 in the layer 10, as shown at reference number 106 in FIG. 1 and in FIG. 2C.

The black ink 38 may be dispensed from an inkjet printhead 26, such as a thermal inkjet printhead or a piezoelectric inkjet printhead. The printhead 26 may be a drop-on-demand printhead or a continuous drop printhead. The printhead 26 may be selected to deliver drops of the black ink 38 at a resolution ranging from about 300 dots per inch (DPI) to about 1200 DPI. In other examples, the printhead 26 may be selected to be able to deliver drops of the black ink 38 at a higher or lower resolution. The drop velocity may range from about 5 m/s to about 24 m/s and the firing frequency may range from about 1 kHz to about 100 kHz.

The printhead 26 may include an array of nozzles through which it is able to selectively eject drops of fluid. In one example, each drop may be in the order of about 10 pico liters (pl) per drop, although it is contemplated that a higher or lower drop size may be used. In some examples, printhead 26 is able to deliver variable size drops of the black ink 38.

It is to be understood that in the examples disclosed herein, the black ink 38 is the fusing agent. Examples of the black ink 38 are water-based dispersions including a radiation absorbing binding agent (i.e., an active material). The active material may be any infrared light absorbing colorant that is black. In an example, the active material is a near infrared light absorber. Any near infrared colorants produced by Fabricolor, Eastman Kodak, or Yamamoto may be used in the black ink 38. As one example, the black ink 38 may be an ink-type formulation including carbon black as the active material. Examples of this ink-type formulation are commercially known as CM997A, 516458, C18928, C93848, C93808, or the like, all of which are available from Hewlett-Packard Company.

The aqueous nature of the black ink 38 enables the black ink 38 to penetrate, at least partially, into the layer 10 of the build material 16. The build material 16 may be hydrophobic, and the presence of a co-solvent and/or a dispersant in the black ink 38 may assist in obtaining a particular wetting behavior.

It is to be understood that a single black ink 38 may be selectively applied to form the layer of the 3D part, or multiple black inks 38 may be selectively applied to form the layer of the 3D part.

After selectively applying the black ink 38 on the portion(s) 40 of the build material 16, a white ink 36 may be selectively applied to the applied black ink 38, as shown at reference number 108 in FIG. 1 and in FIG. 2C. The white ink 36 may be dispensed from another printhead 26' after the black ink 38 is dispensed from the printhead 26. It is to be understood that printhead 26' may have any of the characteristics previously described for printhead 26.

In this example of the method 100, the black ink 38 and the white ink 36 may be dispensed in a single pass or in multiple passes of the printheads 26, 26', as long as the black ink 38 is applied before the white ink 36.

It is to be understood that the applied white ink 36 may form a distinct layer on and/or in the build material 16, due, at least in part, to the white ink 36 being applied to the portion 40 of the build material 16 where the black ink 38 has been applied. The distinct layer of the white ink 36 will be explained in greater detail in reference to FIG. 2D below.

The white ink 36 includes a white colorant, co-solvent, a dispersant, and water. In some instances, the white ink 36 includes these components and no other components. In other instances, the white ink 36 may further include an anti-kogation agent, a dispersing additive, a biocide, an acrylic latex binder, and combinations thereof.

The white ink 36 includes the white colorant, which is opaque in visible wavelengths and transparent to infrared wavelengths. Since the white colorant is opaque in visible wavelengths, the white ink 36 may effectively form a white mask over the applied black ink 38. The white mask helps to improve the color uniformity of the resulting 3D layer or part, since the colored ink 34 may be applied onto the applied white ink 36. Additionally, since the white colorant is transparent to infrared wavelengths, the white ink 36 allows the infrared radiation to reach the black ink 38, whose colorant absorbs the infrared radiation and fuses the build material 16. As a result, the white ink 36 may be added without sacrificing the mechanical properties of the 3D part.

The white colorant may be present in an amount ranging from about 10 wt % to about 60 wt % of the total wt % of the white ink 36. In other examples, the amount of white colorant in the white ink 36 ranges from about 10 wt % to about 40 wt %, or from about 15 wt % to about 35 wt %. Some examples of the white colorant include pigments, such as titanium dioxide ($TiO_2$), zinc oxide (ZnO), calcium carbonate ($CaCO_3$), barium sulfate ($BaSO_4$), or combinations thereof.

Some commercially available examples of the white colorant are available from DuPont under the tradename TI-PURE®, an example of which includes TI-PURE® R-706.

The white colorant in the white ink 36 may, in some instances, be dispersed with a dispersing additive. As such, the dispersing additive helps to uniformly distribute the white colorant throughout the white ink 36. The dispersing additive may also aid in the wetting of the white ink 36 onto the applied black ink 38. The dispersing additive may be present in the white ink 36 in an amount ranging from about 0.01 wt % to about 0.8 wt % based on the total wt % of the white colorant. Some examples of the dispersing additive include a water soluble acrylic acid polymer (e.g., CARBOSPERSE® K7028 available from Lubrizol), a high molecular weight block copolymer with pigment affinic groups (e.g., DISPERBYK®-190 available BYK Additives and Instruments), and combinations thereof.

The white ink 36 also includes a co-solvent. The co-solvent is present in an amount ranging from about 10 wt % to about 30 wt % based on the total wt % of the white ink 36. Some examples of suitable co-solvents include 2-pyrrolidinone, 2-methyl-1,3-propanediol, tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl-2-pyrrolidinone, 1,6-hexanediol, and combinations thereof.

The white ink 36 further includes the dispersant to provide particular wetting properties when applied to the applied black ink 38. The dispersant helps uniformly distribute the white ink 36 onto the applied black ink 38. The dispersant may range from about 0.2 wt % to about 3.0 wt % based on the total wt % of the white colorant in the white ink 36. The dispersant may be non-ionic, cationic, anionic, or combinations thereof. Some examples of the dispersant include a self-emulsifiable, non-ionic wetting agent based on acetylenic diol chemistry (e.g., SURFYNOL® SEF from Air Products and Chemicals, Inc.), an ethoxylated low-foam wetting agent (e.g., SURFYNOL® 440 and SURFYNOL® 465 from Air Products and Chemicals, Inc.), a non-ionic acetylenic diol surface active agent (e.g., SURFYNOL® 104 from Air Products and Chemicals, Inc.), a non-ionic, alkylphenylethoxylate and solvent free surfactant blend (e.g., SURFYNOL® CT-211 from Air Products and Chemicals, Inc.), a non-ionic organic surfactant (e.g., TEGO® Wet 510 from Evonik Industries AG), a non-ionic fluorosurfactant (e.g., CAPSTONE® fluorosurfactants from DuPont, previously known as ZONYL FSO, POLYFOX™ PF-154N from Omnova Solutions Inc.), non-ionic a secondary alcohol ethoxylate (e.g., TERGITOL® 15-S-5, TERGITOL® 15-S-7, and TERGITOL® 15-S-9 all from Dow Chemical Company), a water-soluble non-ionic surfactant (e.g., TERGITOL® TMN-6) and combinations thereof. Examples of anionic dispersants include those in the DOWFAX™ family (from Dow Chemical Company), and examples of cationic dispersants include dodecyltrimethylammonium chloride and hexadecyldimethylammonium chloride. Combinations of any of the previously listed dispersants may also be used.

The white ink 36 may additionally include an anti-kogation agent, a biocide, an acrylic latex binder, and combinations thereof. Examples of anti-kogation agents include oleth-3-phosphate or polyoxyethyene (3) oleyl mono/di-phosphate (e.g., CRODAFOS® N-3A from Croda, now CRODAFOS® O3A), a metal chelator/chelating agent, such as methylglycinediacetic acid (e.g., TRILON® M from BASF Corp.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), an aqueous solution of methylisothiazolone (e.g., KORDEK® MLX from The Dow Chemical Co.), and combinations thereof. Examples of the acrylic latex binder include a copolymer of any two or more of styrene, acrylic acid, methacrylic acid, methyl methacrylate, ethyl methacrylate, and butyl methacrylate.

When included, the anti-kogation agent may be present in an amount ranging from about 0.10 wt % to about 1.00 wt %, the biocide may be present in an amount ranging from about 0.01 wt % to about 0.40 wt %, and the acrylic latex binder may be present in an amount ranging from about 2.00 wt % to about 10.00 wt %, each of which is with respect to the total weight of the white ink 36.

The balance of the white ink 36 is water. As such, the amount of water may vary depending upon the amounts of white colorant, dispersant, and co-solvent, and in some instances anti-kogation agent, the additive dispersant, the acrylic latex binder, and/or the biocide that are included.

In an example, the white ink 36 may be prepared by first milling the white colorant in water and the dispersant additive until a suitable particle size of the white colorant is obtained. Milling forms a white colorant concentrate.

The remaining white ink 36 components (without the white colorant concentrate) are mixed to form an ink vehicle. A balance of water may be added in a suitable amount, taking into account the weight percent of white colorant concentrate that is to be added. With water included, the ink vehicle may be adjusted to a pH from about 8.0 to about 8.5 with potassium hydroxide (KOH), or another suitable base. The white colorant concentrate is added (e.g., drop-wise) to the ink vehicle until the white colorant is present in a suitable amount. The ink vehicle may be mixed as the white colorant concentrate is added thereto. Once the white colorant and the ink vehicle are fully mixed, the pH of the mixture may be adjusted to about 9.0 to about 9.2 with KOH or another suitable base. The mixture may be filtered to obtain the white ink 36 used in the 3D printing methods disclosed herein.

After selectively applying the white ink 36, a colored ink 34 may be selectively applied to the applied white ink 36, as shown at reference number 110 in FIG. 1 and in FIG. 2C. As shown in FIG. 2C, the colored ink 34 may be dispensed from another printhead 26" after the white ink 36 is dispensed from the printhead 26'. It is to be understood that printhead 26" have any of the characteristics previously described for printhead 26.

In this example of the method 100, the black ink 38, the white ink 36, and the colored ink 34 may be dispensed in a single pass or in multiple passes of the printheads 26, 26', 26''', as long as the black ink 38 is applied before the white ink 36, and the white ink 36 is applied before the colored ink 34.

It is to be understood that the applied colored ink 34 may form a distinct layer on and/or in the build material 16, due, at least in part, to the colored ink 34 being applied to the portion 40 of the build material 16 where the black ink 38 and the white ink 36 have been applied. The distinct layer of the colored ink 34 will be explained in greater detail in reference to FIG. 2D below.

The colored ink 34 includes a colorant (e.g., pigment and/or dye) having a color other than white or black. Examples of the other colors include cyan, magenta, yellow, etc. In some instances, the colorant of the colored ink 34 may also be transparent to infrared wavelengths. In these instances, the colored ink 34 allows the infrared radiation to reach the black ink 38, whose colorant absorbs the infrared radiation and generates thermal energy to fuse the build material 16. Examples of IR transparent colorants include acid yellow 23 (AY 23), AY17, acid red 52 (AR 52), AR 289, and reactive red 180 (RR 180). In other instances, the colorant of the colored ink 34 may not be completely transparent to infrared wavelengths. For example, the colorant of the colored ink 34 may absorb some visible wavelengths and some IR wavelengths. Some examples of these colorants include cyan colorants, such as direct blue 199 (DB 199) and pigment blue 15:3 (PB 15:3).

In addition to the non-black and non-white colorant, the colored ink 34 may include similar components as the white ink 36 (e.g., co-solvent(s), dispersant(s), anti-kogation agent(s), biocide(s), water, etc.). The colored ink 34 may also include a binder or other additives, such as a humectant and lubricant (e.g., LIPONIC® EG-1 (LEG-1) from Lipo Chemicals), a chelating agent (e.g., disodium ethylenediaminetetraacetic acid (EDTA-Na)), and/or a buffer. An example of the pigment based colored ink 34 may include from about 1 wt % to about 10 wt % of pigment(s), from about 10 wt % to about 30 wt % of co-solvent(s), from about 0.5 wt % to about 2 wt % of dispersant(s), from 0.01 wt % to about 1 wt % of anti-kogation agent(s), from about 0.1 wt % to about 5 wt % of binder(s), from about 0.05 wt % to about 0.1 wt % biocide(s), and a balance of water. An example of the dye based colored ink 34 may include from about 1 wt % to about 7 wt % of dye(s), from about 10 wt % to about 30 wt % of co-solvent(s), from about 0.25 wt % to about 2 wt % of dispersant(s), from 0.05 wt % to about 0.1 wt % of chelating agent(s), from about 0.005 wt % to about 0.2 wt % of buffer(s), from about 0.05 wt % to about 0.1 wt % biocide(s), and a balance of water.

Some examples of the colored ink 34 include a set of cyan, magenta, and yellow inks, such as C1893A (cyan), C1984A (magenta), and C1985A (yellow); or C4801A (cyan), C4802A (magenta), and C4803A (yellow); all of which are available from Hewlett-Packard Company. Other commercially available colored inks include C9384A (printhead HP 72), C9383A (printhead HP 72), C4901A (printhead HP 940), and C4900A (printhead HP 940).

The printheads 26, 26', 26" may be attached to a moving XY stage or a translational carriage (neither of which is shown) that moves the printheads 26, 26', 26" adjacent to the fabrication bed 22 in order to deposit the black ink 38, white ink 36, and colored ink 34 in desirable area(s). In other examples, the printheads 26, 26', 26" may be fixed while a support member (similar to the fabrication bed 22) is configured to move relative thereto. The printheads 26, 26', 26" may be programmed to receive commands from the central processing unit and to deposit the black ink 38, the white ink 36, and/or the colored ink 34 according to a pattern of a cross-section for the layer of the 3D part that is to be formed. As used herein, the cross-section of the layer of the part to be formed refers to the cross-section that is parallel to the contact surface 25.

In an example, the printheads 26, 26', 26" may have a length that enables it to span the whole width of the fabrication bed 22 in a page-wide array configuration. As used herein, the term 'width' generally denotes the shortest dimension in the plane parallel to the X and Y axes of the contact surface 25, and the term 'length' denotes the longest dimension in this plane. However, it is to be understood that in other examples the term 'width' may be interchangeable with the term 'length'. In an example, the page-wide array configuration is achieved through a suitable arrangement of multiple printheads of each type of printhead 26, 26', 26". In another example, the page-wide array configuration is achieved through a single printhead of each type of printhead 26, 26', 26". In this other example, each of the single printheads 26, 26', 26" may include an array of nozzles having a length to enable them to span the width of the fabrication bed 22. This configuration may be desirable for single pass printing. In still other examples of the printing system 12, the printheads 26, 26', 26" may have a shorter length that does not enable them to span the whole width of the fabrication bed 22. In these other examples, the printheads 26, 26', 26" may be movable bi-directionally across the width of the fabrication bed 22. This configuration enables selective delivery of the inks 38, 36, 34 across the whole width and length of the fabrication bed 22 using multiple passes.

In the example shown in FIG. 2C, the printhead 26 selectively applies the black ink 38 on those portion(s) 40 of the layer 10 that are to be fused to become, e.g., a layer of the 3D part. The printheads 26', 26" selectively and respectively apply the white ink 36 and colored ink 34 on at least some of the portion(s) 40 of the layer 10, which have the black ink 38 applied thereon.

In some instances, the white ink 36 and colored ink 34 may be applied over all of the applied black ink 38, and thus over the entire portion 40. Application of the inks 36, 34 over all of the black ink 38 may be used during the fabrication of each layer of a multi-layered 3D part, during the fabrication of a single layered 3D part, or during the fabrication of the outermost layer of a multi-layered 3D part (the latter of which is discussed further in reference to FIG. 5).

In other instances, the white ink 36 and colored ink 34 may be applied to some of the applied black ink 38, and thus over some (but not all) of the portion 40. Application of the white ink 36 and colored ink 34 on some, but not all, of the applied black ink 38 may be used, for example, when an outer surface of the layer or part being fabricated will be visible when the final part is complete (see e.g., the area(s) 41 of the 3D part 60 shown in FIG. 6). If subsequent layers are to be formed on the fused layer (e.g., reference numeral 15 in FIG. 2E), but a portion of that fused layer 15 will be visible in the final part (i.e., not covered by a subsequent layer), then the white ink 36 and colored ink 34 may be applied on the black ink 38 at area(s) 41 of layer 15 that will be visible in the final 3D part and not applied on the black ink 38 at area(s) of layer 15 that will be covered by a subsequently formed layer. Still further, application of the white ink 36 and colored ink 34 on some, but not all, of the applied black ink 38 may also be used, for example, when an outer surface of the layer or part being fabricated is to be black. In these instances, the white ink 36 and colored ink 34 may be applied to area(s) 41 that are to be colored, and not applied to area(s) (not shown) that are to remain black.

Figure 2D:
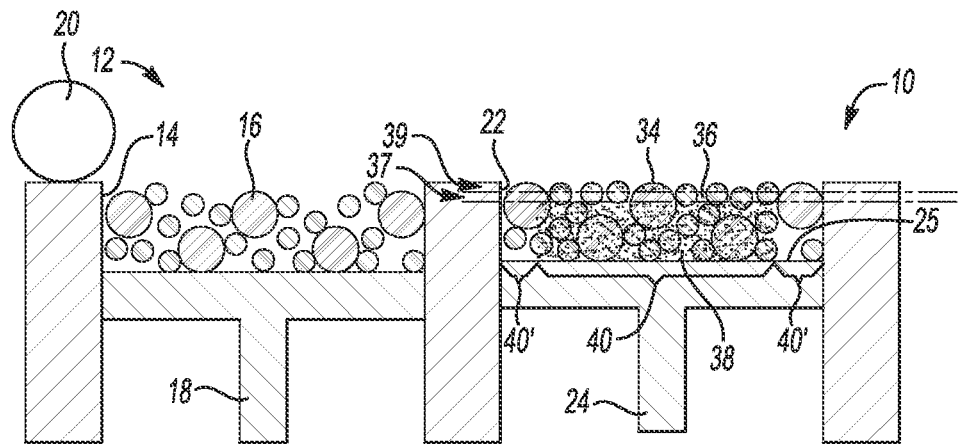

Referring to FIG. 2D, the black ink 38 penetrates into the layer 10 of the build material 16. The black ink 38 at least partially fills the voids between particles of the build material 16, allowing the black ink 38 coat the particles of the build material 16. In some instances, the black ink 38 fills most of the voids where the black ink 38 is applied to the build material 16. In addition to at least partially filling voids between particles of the build material 16, the black ink 38 may penetrate the build material particles 16 themselves. In an example, the black ink 38 may penetrate into the particles of the build material up to 10 μm.

The application of the white ink 36 forms a distinct layer 37 on the build material particles 16 having the black ink 38 applied thereon, and the application of the colored ink 34 on the white ink 36 forms a distinct layer 39 on the build material particles 16 having the white ink 36 applied thereon. By "distinct layer," it is meant that most (e.g., over 60%) of the deposited ink 36 or 34 sits on a surface to which it is applied, and is visibly separated (e.g., in SEM images) from a previously applied ink 38 or 36.

The distinct layer 37 of white ink 36 may be formed because the black ink 38 has at least partially filled the voids between the build material particles 16, and thus forms a surface (of build material 16 and black ink 38) upon which the white ink 36 can be deposited. As a result, the white ink 36 coats this surface and forms the distinct layer 37. It is to be understood that the surface of build material 16 and black ink 38 may still have some voids (which were not filled by the black ink 38), and thus the white ink 36 may at least partially fill these voids. As a result, the white ink 36 of the distinct layer 37 may be slightly intermingled with some of the black ink 38. However, the white ink 36 does not substantially penetrate into the layer 10 of the build material 16 due to the applied black ink 38.

Similarly, the distinct layer 39 of colored ink 34 may be formed on the distinct layer 37. The distinct layer 39 of colored ink 34 may be formed because the white ink 36 has at least partially filled the voids between the build material particles 16, and thus forms a surface (of build material 16 and white ink 36) upon which the colored ink 34 can be deposited. As a result, the colored ink 34 coats this surface and forms the distinct layer 39. It is to be understood that the surface of build material 16 and white ink 34 may still have some voids (which were not filled by the black ink 38 or the white ink 36), and thus the colored ink 34 may at least partially fill these voids. As a result, the colored ink 34 of the distinct layer 39 may be slightly intermingled with some of the white ink 36 (or even the black ink 38). However, the colored ink 34 does not substantially penetrate into the layer 10 of the build material 16 due to the applied white ink 36 and the black ink 38.

It is to be understood that when pigments are used as the colorants in the black ink 38, the white ink 36, and the colored ink 34, the intermingling of the inks with adjacent inks (e.g., 34 with 36 and 36 with 38) is less likely to occur than if dyes were used. This is due, in part, to the fact that the pigment particles are generally larger than dye particles and can more effectively fill the voids between the build material 16, and thus form a surface upon which the next ink can be applied. As such, in these instances, distinct layers 37 and 39 have less pigment intermingling at the interfaces. In instances where a dye is used in the colored ink 34, there may be more intermingling between the distinct layers 37 and 39 than if a pigment were used in the colored ink 34.

After the inks 38, 36, 34 are selectively applied in the specific portions of the layer 10, the entire layer 10 of the build material 16 is exposed to radiation R. This is shown at reference numeral 112 of FIG. 1 and in FIG. 2E.

The radiation R is emitted from a radiation source 30, such as an IR (e.g., near-IR) curing lamp, or IR (e.g., near-IR) light emitting diodes (LED), or lasers with specific IR or near-IR wavelengths. Any radiation source 30 may be used that emits a wavelength in the infrared spectrum, for example near-infrared spectrum. The radiation source 30 may be attached, for example, to a carriage that also holds the printhead(s) 26, 26', 26". The carriage may move the radiation source 30 into a position that is adjacent to the fabrication bed 22. The radiation source 30 may be programmed to receive commands from the central processing unit and to expose the layer 10, including the inks 38, 36, 34 and build material 16, to radiation R.

The length of time the radiation R is applied for, or energy exposure time, may be dependent, for example, on one or more of: characteristics of the radiation source 30; characteristics of the build material 16; and/or characteristics of the black ink 38.

The black ink 38 enhances the absorption of the radiation R, converts the absorbed radiation to thermal energy, and promotes the transfer of the thermal heat to the build material 16 in contact therewith. In an example, the black ink 38 sufficiently elevates the temperature of the build material 16 above the melting point(s), allowing curing (e.g., sintering, binding, fusing, etc.) of the build material particles to take place.

Still further, it is to be understood that portions of the build material 16 that do not have the black ink 38 applied thereto do not absorb enough energy to fuse. However, the generated thermal energy may propagate into the surrounding build material 16 that does not have black ink 38 applied thereto. The propagation of thermal energy may cause at least some of the build material 16 in contact with the white colorant from the white ink 36 and at least some of the build material 16 in contact with the colorant from the colored ink 34 to at least partially fuse. As a result, the colorants of the white ink 36 and the colored ink 34 may become embedded in these at least partially fused portions. Since, in this example method 100, the white and colored inks 36, 34 are sequentially applied on/over the black ink 38, the embedded colored ink 34 colorant is at the outermost surface of the formed layer or part 15, and thus the resulting layer/part 15 appears to be colored (denoted in part by the light speckles at the surface of layer/part 15 in FIG. 2E).

Figure 2E:
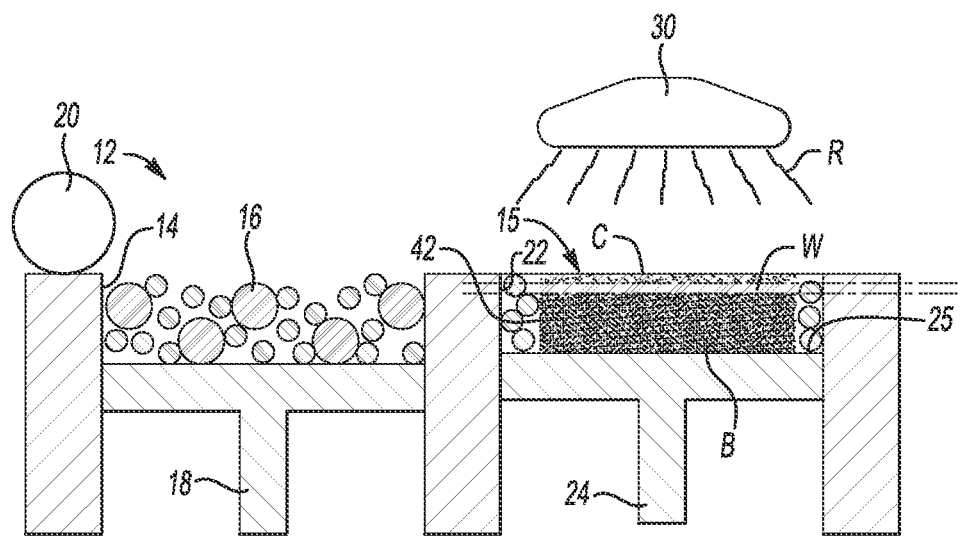

Exposure to radiation R forms the 3D layer or part 15, as shown in FIG. 2E. In FIG. 2E, the black portion of the layer or part 15 is labeled B, the white portion of the layer or part 15 is labeled W, and the colored portion of the layer or part 15 is labeled C.

In instances where the method 100 results in the formation of the final 3D part 15, the part 15 may be removed from the fabrication bed 22, and any uncured build material 16 may be removed from the 3D part 15. The uncured build material 16 may be washed and then reused. In instances where the method 100 results in the formation of a layer 15 of a part to be formed, it is to be understood that the method 100 may be repeated in order to build up additional layers to form the part. This is further described below.

As illustrated in FIGS. 2C-2E, the white and colored inks 36, 34 are applied to a top surface of the layer 10 on at least some portions of the applied black ink 38 during formation of the 3D layer or part 15. In this example method 100, it may also be desirable to color the sides 42 of the 3D layer or part 15 that is formed. This may be accomplished in at least two different ways. One example will be discussed in reference to FIGS. 2D and 6, and the other example will be discussed in reference to FIGS. 2E and 6.

In the first example for coloring the sides, the white and colored inks 36, 34 may be applied to build material 16 that is adjacent to the portion 40 where the black ink 38 is applied (i.e., prior to fusing). In reference to FIG. 2D, portion(s) 40' may have white ink 36 applied along the side edge of the build material 16 having the black ink 38 thereon and colored ink 34 applied along the applied white ink 36. The inks 36, 34 may be applied in a single pass on the portion 40 and along the sides of the portion 40. When the materials are then exposed to radiation R, the white and colored colorants deposited along the sides of the portion 40 will become embedded in the at least partially fused portions of build material 16 along the sides 42 (shown in FIG. 6). This will form the white portion W and the colored portion C along the sides 42 of the solidified black portion B (see FIG. 6).

Figure 6:
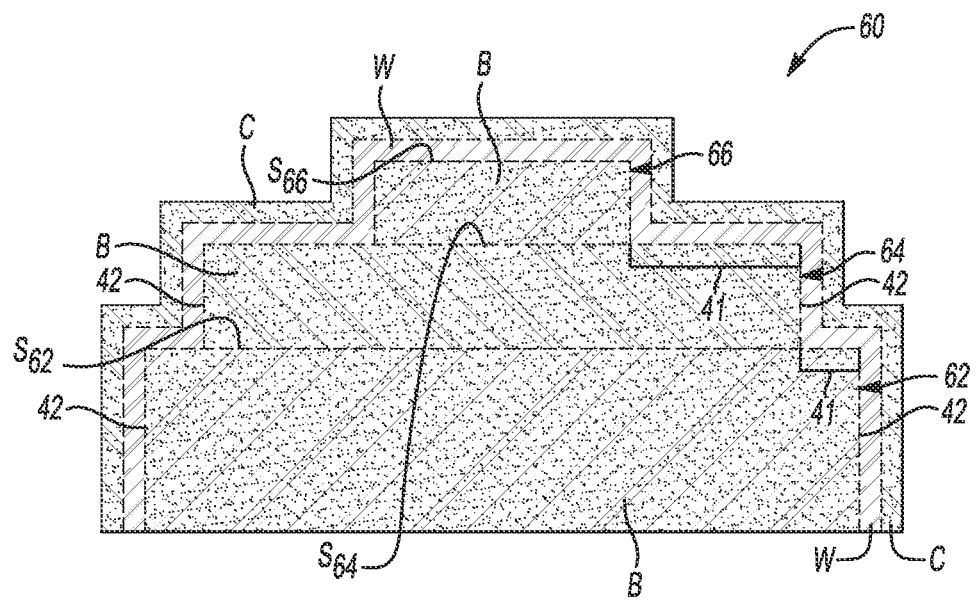
FIG. 6 is a semi-schematic, cross-sectional view of an example of the 3D part formed by the methods shown in FIGS. 2A through 2E or FIGS. 4A through 4E.

In the second example for coloring the sides, the white and colored inks 36, 34 may be applied directly to the sides 42 of the fused layer or part. It is to be understood that in this example, the layer or part has color on the top but not yet on the fused side(s) 42. Some of the build material 16 is partially embedded in the perimeter (e.g., at the side(s) 42) of the fused layer or part. In these instances, the method 100 further includes selectively applying the white ink 36 and then the colored ink 34 on the side(s) 42 of the 3D layer or part 15 (FIG. 2E) or part 60 (FIG. 6). This impregnates the side(s) with color. When the white ink 36 and colored ink 34 are applied to the at least partially fused side(s) 42, the respective inks 36, 34 infuse among the at least partially fused particles to form white portions W and the colored portions C at the side(s) 42. The vehicle components of the white ink 36 and colored ink 34 may evaporate after being selectively applied (due to heat from the fused layer/part and/or maintained heat in the fabrication bed 22), and the respective colorants may remain in the portions W, C.

Adding to color to the fused sides(s) 42 of the part may also involve additional processes. In an example, the layer or part having color on the top but not yet on the fused sides 42 may be reoriented within the fabrication bed 22 so that the printheads 26', 26" can deposit the white and colored inks 36, 34 on the fused side(s) 42. In another example, the white ink 36 and colored ink 34 may be added to the side(s) 42 while the 3D part 15, 60 is cooling. In this instance, the 3D part 15, 60 may first be cleaned, decaked, loaded back into the printing system 12, and rotated repeatedly to coat the side(s) 42. The temperature during this process would need to be high enough to dry the ink vehicle of the white ink 36 and the colored ink 34.

As mentioned above, if the layer or part 15 is not the final 3D part that is to be formed, reference numerals 102 through 112 of the method 100 of FIG. 1 (shown and described in reference to FIGS. 2A through 2E) may be repeated as many times suitable to create all of the layers, and thus the final part. An example of the multi-layered final part 60 is shown in FIG. 6. In FIG. 6, the various layers are labeled 62, 64, 66, and have been sequentially built up to form the part 60.

Each of the layers 62, 64, 66, includes cured (sintered, fused, etc.) build material 16 and the active material in the black ink 38 binding the cured build material 16. While not shown in part 60 in FIG. 6, in some examples of the method 100, the white ink 36 and colored ink 34 may be applied over all of the applied black ink 38 during layer formation, and thus will be present along the entire surface $S_{62}$, $S_{64}$, $S_{66}$ of each layer 62, 64, 66 that is formed (even if that surface $S_{62}$, $S_{64}$, $S_{66}$ is not visible in the final part 60). Also while not shown in part 60 in FIG. 6, in some other examples of the method 100, the white ink 36 and colored ink 34 may be applied to some of the applied black ink 38 during layer formation, and thus will be present along some (but not all) of the surface $S_{62}$, $S_{64}$, $S_{66}$ of each layer 62, 64, 66 that is formed.

To form the part 60 shown in FIG. 6, during the method 100, the white ink 36 and colored ink 34 may be applied to some (less than all) of the applied black ink 38 during layer 62, 64 formation, and may be applied to all of the applied black in 38 during layer 66 formation. In this example then, the colorants of the white and colored inks 36, 34 will be present along some (but not all) of the surfaces $S_{62}$, $S_{64}$, and along all of the surface $S_{66}$ in the final part 60. In this example, the white ink 36 and colored ink 34 may have been applied on the black ink 38 and the build material 16 where visible, colored area(s) 41 of the respective layers 62, 64, 66 are to be formed.

It is to be understood that heat absorbed during the application of energy from the portion(s) of the build material 16 on which black ink 38 has been delivered or has penetrated (when forming subsequently layers 64, 66) may propagate to a previously solidified layer, such as layer 62, causing at least some of that layer to heat up above its melting point. This effect helps create strong interlayer bonding between adjacent layers 62, 64, 66 of the 3D part 60.

As subsequent layers 64, 66 are formed, it is to be understood that the delivery piston 18 is pushed closer to the opening of the delivery bed 14, and the supply of the build material 16 in the delivery bed 14 is diminished (compared, for example, to FIG. 2A at the outset of the method 100). The fabrication piston 24 is pushed further away from the opening of the fabrication bed 22 in order to accommodate the subsequent layer(s) of build material 16 and the selectively applied inks 38, 36, 34. Since at least some of the build material 16 remains uncured after each layer 62, 64, 66 is formed, the 3D part 60 is at least partially surrounded by the uncured build material 16 in the fabrication bed 22.

When the 3D part 60 is complete, it may be removed from the fabrication bed 22, and the uncured build material 16 may be removed from the 3D part 60. In some instances, the side(s) 42 or the entire perimeter of the part 60 may be colored as previously described.

FIG. 6 illustrates one example of the 3D part 60. It is to be understood, however, that the subsequently formed layers 62, 64, 66 may have any desirable shape and/or thickness and may be the same as or different from any other layer 62, 64, 66 depending upon the size, shape, etc. of the 3D part 60 that is to be formed. Additionally, the area(s) 41 may vary based on the size, shape, etc. of the 3D part 60 that is to be formed.

Figure 5:
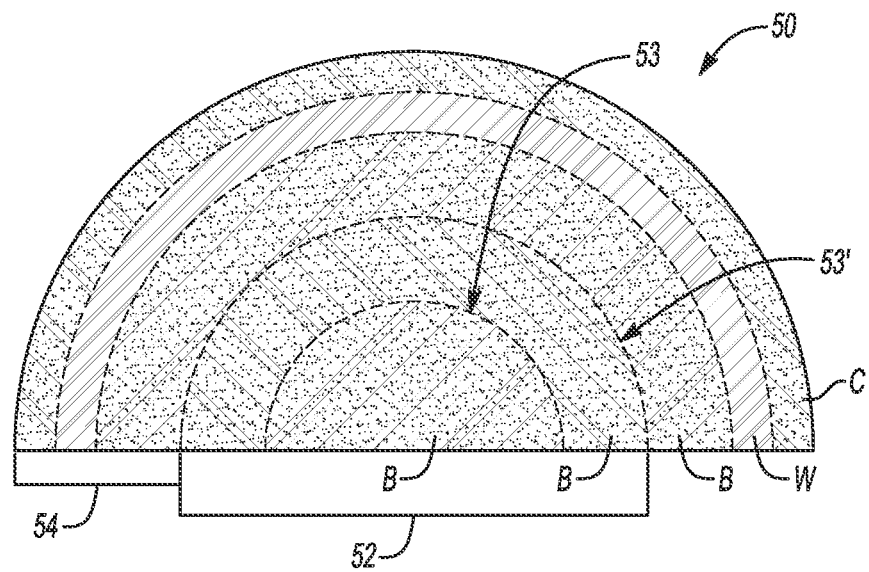
FIG. 5 is a semi-schematic, cross-sectional view of an example of the 3D part formed by the method shown in FIGS. 2A through 2E or FIGS. 4A through 4E.

In yet another example of the method 100, it may be desirable to add color to the outermost layer of the part alone. In this example, prior to performing reference numerals 102 through 112 of the method 100, a part precursor may be built. An example of the part precursor 52 is shown in FIG. 5. The precursor part 52 may include layer(s) 53, 53', each of which is built by performing reference numerals 102 through 106 of the method 100, and then exposing the build material 16 and black ink 38 used to form the respective layer(s) 53, 53' to the radiation R. The sequence of reference numerals 102 through 106 and radiation R exposure may be repeated as many times as suitable to create the precursor part 52, which is shown in FIG. 5 with multiple black colored layers 53, 53'.

Once the precursor part 52 is formed, the method 100 including reference numbers 102 through 112 (shown and described in reference to FIGS. 2A through 2E) may be performed as previously described herein. In this example, the build material 16 is applied to the surface of layer 53', the black ink 38 is applied to the build material 16 on the layer 53', the white ink 36 is applied to the black ink 38, the colored ink 34 is applied to the white ink 36, and then the radiation R is applied. This forms an additional layer 54 on the part precursor 52 that includes a black portion B directly adjacent to the precursor part 52, the white portion W directly adjacent to the black portion B, and the colored portion C directly adjacent to the white portion W. The colored portion C forms the outer surface of the final 3D part 50, as shown in FIG. 5.

FIG. 5 illustrates one example of the 3D part 50 that may be formed. It is to be understood, however, that the precursor part 52 and the additional layer 54 may have any shape and/or thickness.

Figure 3:
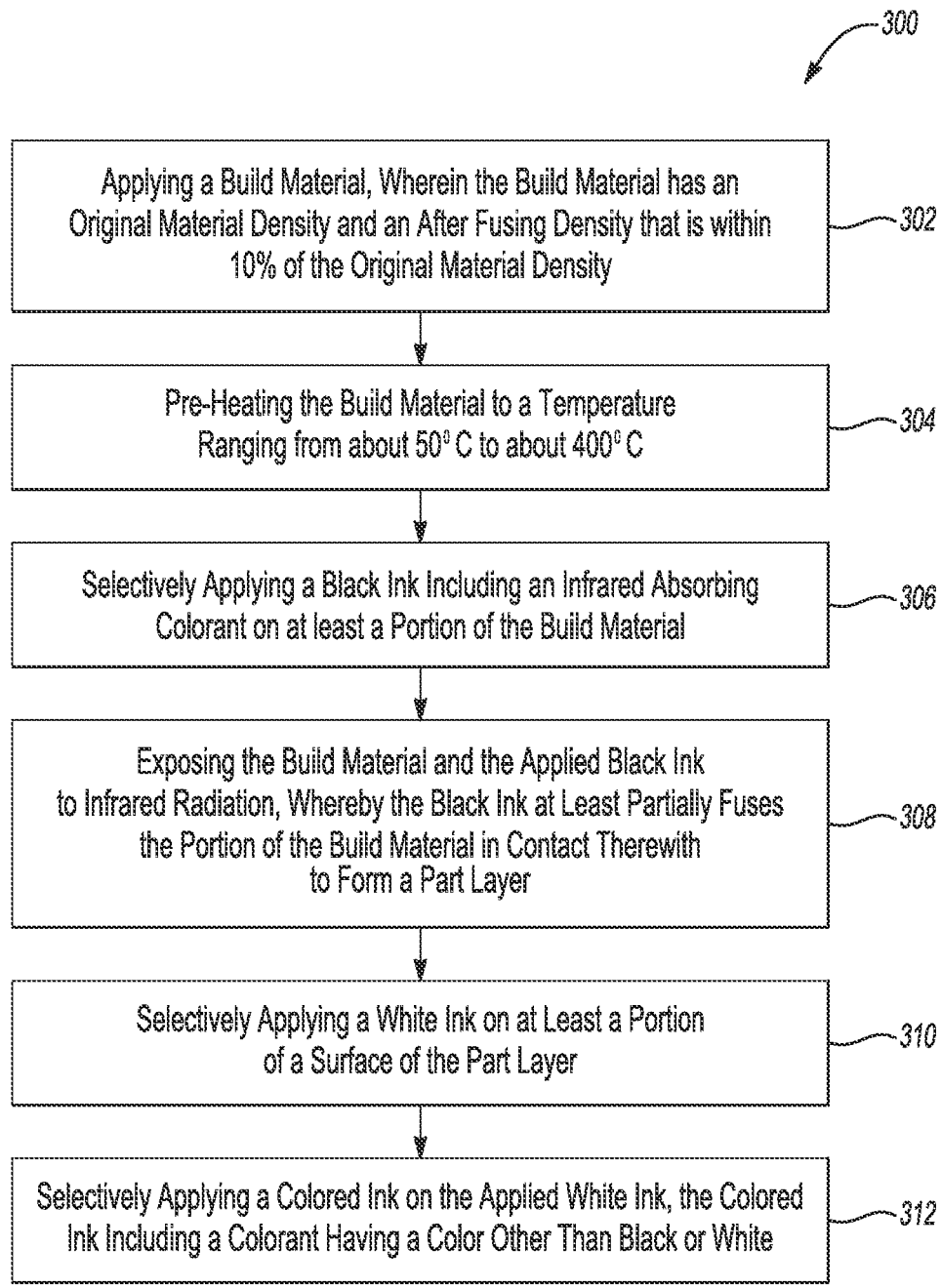
FIG. 3 is another flow diagram illustrating another example of the 3D printing method disclosed herein.

Referring now to FIG. 3, another example of the method 300 for forming a three-dimensional part is shown. It is to be understood that throughout the discussion of FIG. 3, FIGS. 4A through 4E, and FIG. 6 will also be discussed. It is to be understood that the components (e.g., system 12, build material 16, inks 34, 36, 38, etc.) used to form the 3D part with the method 300 may be the same components previously described in reference to the method 100.

As shown at reference numeral 302, the method 100 includes applying the build material 16 (which has an original material density and an after fusing density that is within 10% of the original material density). An example of reference numeral 302 is shown in cross-section at FIG. 4A. In the example shown in FIG. 4A, one layer 10 of the build material 16 has been applied.

Figure 4A:
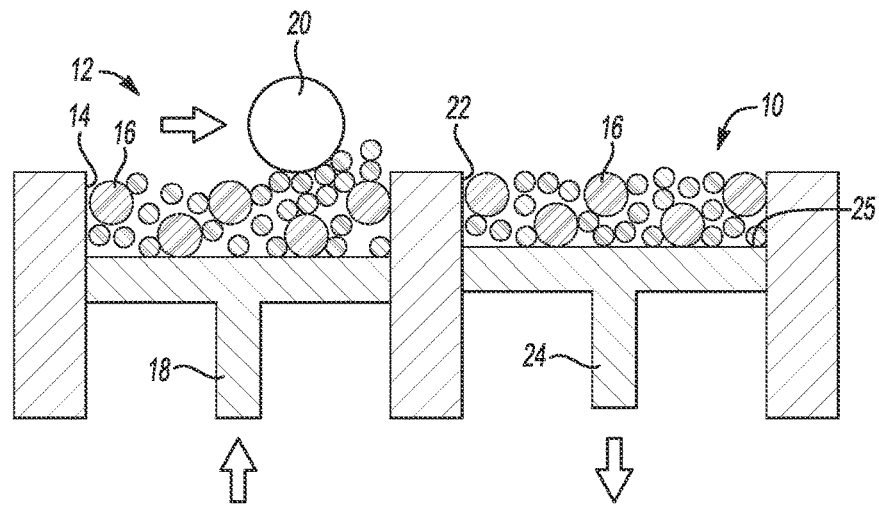
FIGS. 4A through 4E are semi-schematic, cross-sectional views depicting the example 3D printing method of FIG. 3.
Figure 4B:
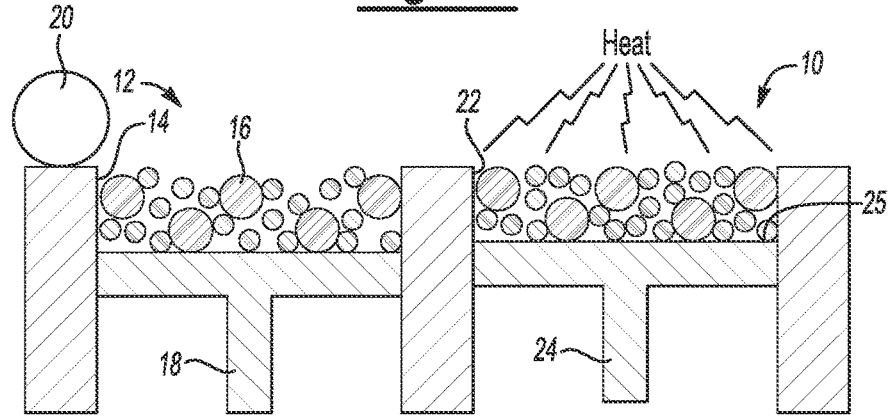

After the layer 10 of the build material 16 is applied in the fabrication bed 22, the layer 10 is exposed to heating (as shown at reference number 304 in FIG. 3 and in FIG. 4B). Heating is performed to pre-heat the build material 16, as previously described in reference to FIGS. 1 and 2B.

Figure 4C:
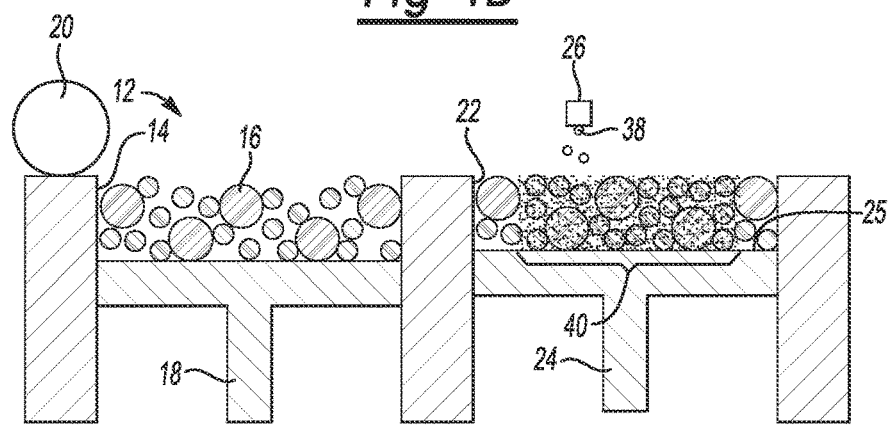

After pre-heating the layer 10, the black ink 38 is selectively applied on at least a portion 40 of the build material 16 in the layer 10, as shown at reference numeral 306 in FIG. 3 and in FIG. 4C. As illustrated in FIG. 4C, the black ink 38 may be dispensed from the inkjet printhead 26. In the example shown in FIG. 4C, the printhead 26 selectively applies the black ink 38 on those portion(s) 40 of the layer 10 that are to be fused to become, e.g., a layer of the 3D part.

In the method 300, after the black ink 38 is selectively applied in the specific portion(s) 40 of the layer 10, the entire layer 10 of the build material 16 is exposed to radiation R. This is shown at reference numeral 308 of FIG. 3 and in FIG. 4D.

Figure 4D:
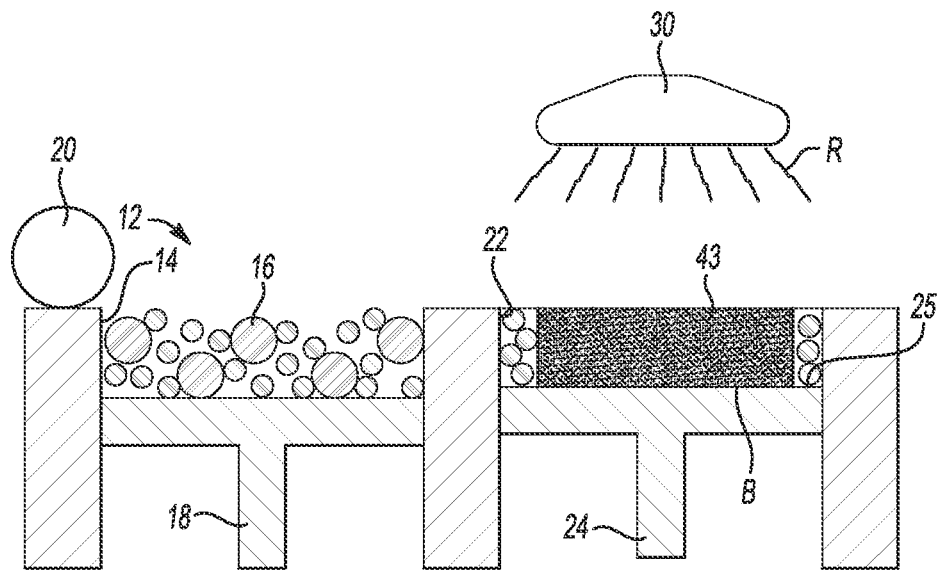

The radiation R is emitted from the radiation source 30. As previously mentioned, the length of time the radiation R is applied for, or energy exposure time, may be dependent, for example, on one or more of: characteristics of the radiation source 30; characteristics of the build material 16; and/or characteristics of the black ink 38. The exposure to radiation R forms a part layer 43 that is black B, as shown in FIG. 4D.

Figure 4E:
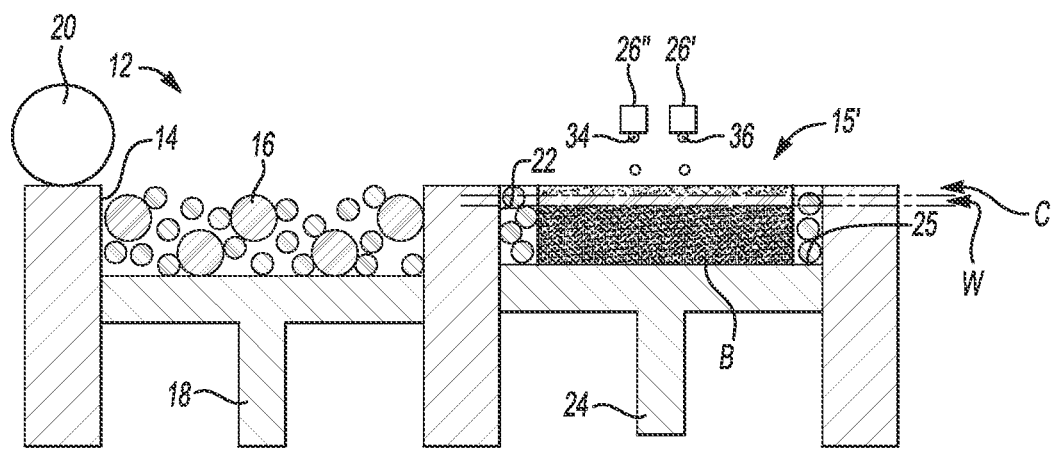

After exposure to radiation R, reference numerals 310 and 312 of the method 300, as shown in FIG. 4E, are performed.

The printheads 26', 26" selectively and respectively apply the white ink 36 and colored ink 34 on at least some of the portion(s) of the surface of the part layer 43. The surface of the part layer 43 may be the top surface, the side surface, the bottom surface, and combinations thereof. As an example, the white ink 36 and the colored ink 34 may be applied over the entire part layer 43 (i.e., all of its surfaces or the perimeter) to form the 3D layer or part. In the example shown in FIG. 4E, the white ink 36 and the colored ink 34 may be applied over the entire top surface and the side surface(s) of the part layer 43 (i.e., all of its exposed surfaces) to form the 3D layer or part 15'.

It is to be understood that the exposure to radiation R (reference numeral 308 and FIG. 4D) leaves at least partially fused build material attached at the surface(s) of the part layer 43. When the white ink 36 and colored ink 34 are applied to the surface(s), the respective inks 36, 34 infuse among the at least partially fused particles to form the white portions W and the colored portions C at these surface(s). Additional layer(s) may be formed on the 3D layer of part 15', where each layer is formed by adding build material 16, applying black ink 38, fusing, and then applying white ink 36 and colored ink 34.

In another example of the method 300, reference numerals 302 through 308 of FIG. 3 (shown and described in reference to FIGS. 4A through 4D) may be repeated as many times as suitable to create multiple, black colored, layers, for example, the black portion B of layers 62, 64, 66 shown in FIG. 6 or the black portion B of layers 53, 53', 54 as shown in FIG. 5. At this point in this example of the method 300, the layers 62, 64, 66 or 53, 53' do not yet have the white ink 36 or the colored ink 34 applied thereto.

When the formation of the black portion B of layers 62, 64, 66 (FIG. 6) or layers 53, 53', 54 (FIG. 5) is complete, reference numerals 310 and 312 of the method 300 may be performed. In some instances, the white ink 36 and colored ink 34 may be sequentially applied to some (but not all) of the surfaces of each of the multiple layers (e.g., portion(s) of the top surface(s) $S_{62}$, $S_{64}$, $S_{66}$, or the side surface(s) 42 shown in FIG. 6). In other instances, the white ink 36 and the colored ink 34 may be applied sequentially to the all of the surfaces of each of the multiple layers (e.g., the top surface(s) $S_{62}$, $S_{64}$, $S_{66}$, and the side surface(s) 42 shown in FIG. 6). As such, the white ink 36 and the colored ink 34 may applied to the entire perimeter of the formed part in order to impregnate color into the partially fused build material 16 at the perimeter of the formed part. In this example, the white ink 36 and the colored ink 34 may infuse into or become embedded in the at least partially fused portion at the surface(s) of the layers 62, 64, 66 (FIG. 6) or the layer 54 (FIG. 5).

Figure 7:
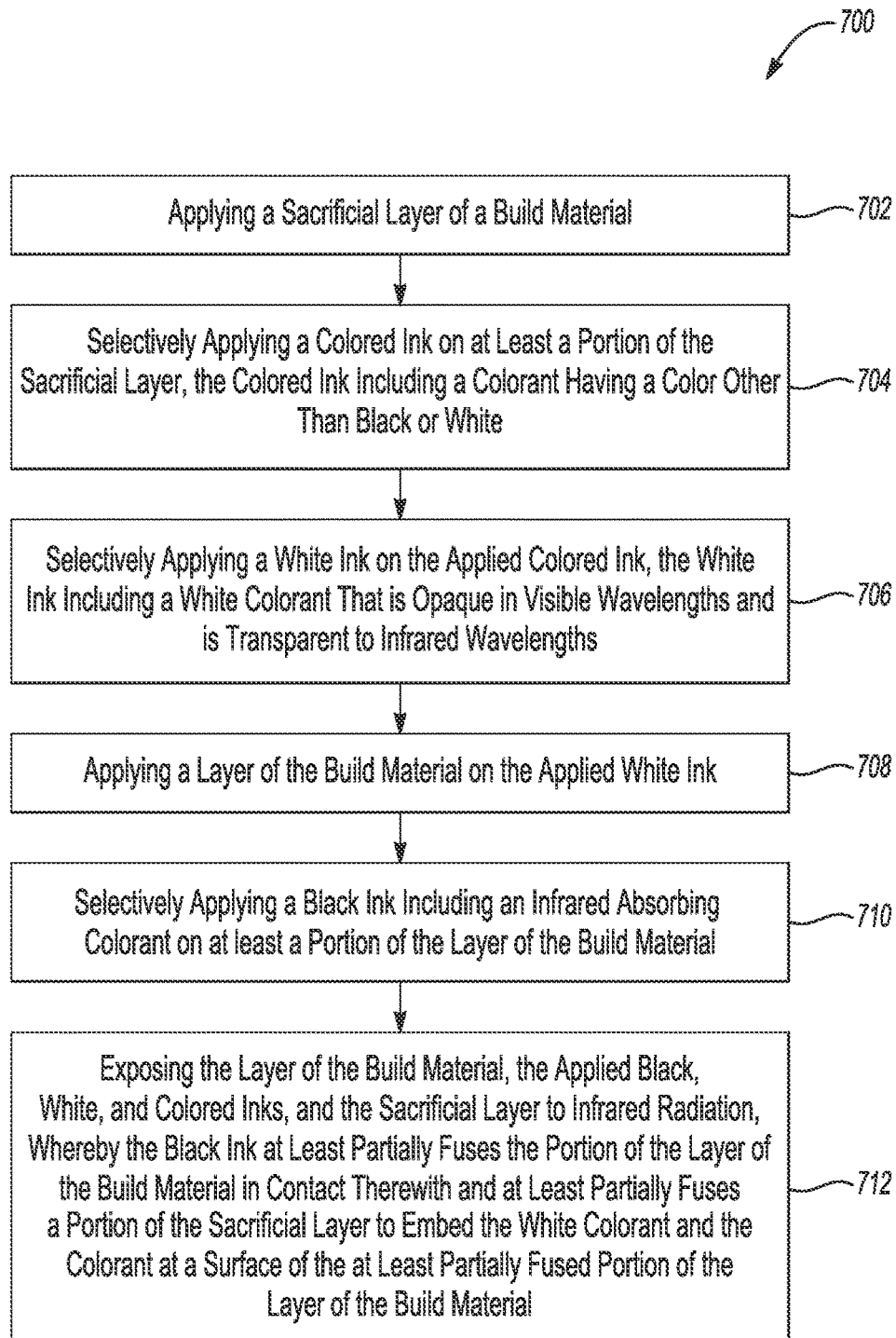
FIG. 7 is a flow diagram illustrating yet another example of the 3D printing method disclosed herein.

Referring now to FIG. 7, another example of the method 700 for forming a three-dimensional part is shown. It is to be understood that FIGS. 8A through 8E will be discussed in conjunction with FIG. 7. It is to be understood that the components (e.g., system 12, build material 16, inks 34, 36, 38, etc.) used to form the 3D part with the method 700 may be the same components previously described in reference to the method 100. The method 700 may be used when adding color to the bottom surface of a 3D part.

Figure 8A:
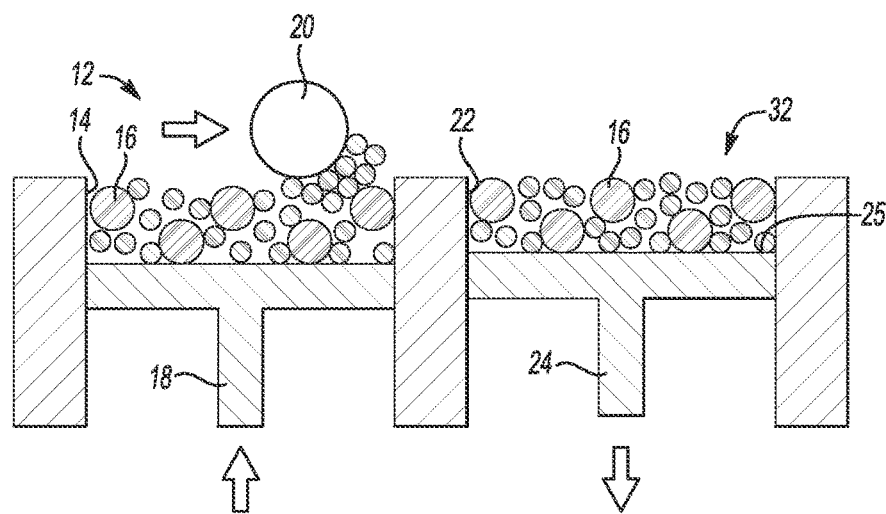
FIGS. 8A through 8E are cross-sectional views depicting the example of the 3D printing method of FIG. 7.

At reference numeral 702 of FIG. 7 and in FIG. 8A, a sacrificial layer 32 of build material 16 is applied to the fabrication bed 22. The sacrificial layer 32 of build material 16 may be any of the build materials 16 previously described herein in reference to FIG. 1 and FIGS. 2A through 2E.

Figure 8B:
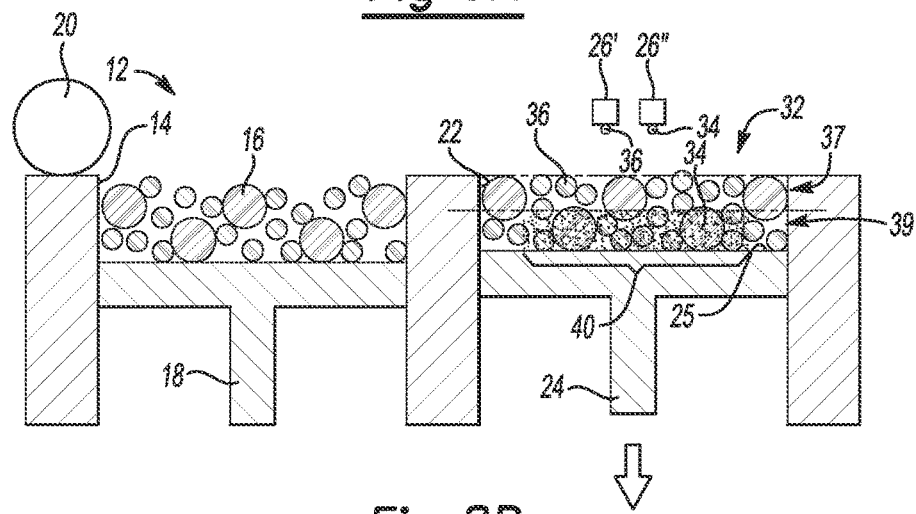

At reference numerals 704 through 706 of FIG. 7, and in FIG. 8B, the printheads 26", 26' selectively and respectively apply the colored ink 34 and then the white ink 36 on at least some of the portion(s) of the sacrificial layer 32. In some instances, the colored ink 34 and white ink 36 may be applied to all of the sacrificial layer 32. In other instances, the colored ink 34 and white ink 36 may be applied to some (but not all) of the sacrificial layer 32 that will form a specific colored portion of the bottom surface of the 3D part (e.g., where a portion of the bottom surface is to be black and colored). In still other instances, the colored ink 34 and the white ink 36 may be applied to the portion(s) 40 of the sacrificial layer 32 that will form the entire bottom surface of the 3D part.

The colored ink 34 will penetrate at least partially into the sacrificial layer 32 to form the distinct layer 39. Depending upon the particle size of the colorant in the colored ink 34 and size of the voids between the particles of build material 16, the colored ink 34 may penetrate throughout the entire thickness of the sacrificial layer 32. This creates a surface upon the white ink 36 may be applied. When deposited, the white ink 36 will penetrate at least partially into the sacrificial layer 32 to form the distinct layer 37.

Figure 8C:
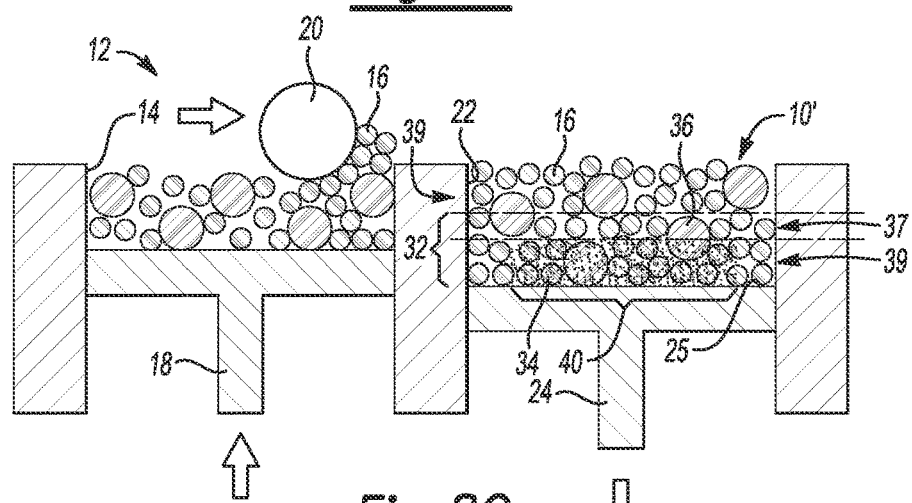

After applying the colored ink 34 and then the white ink 36, a layer 10' of the build material 16 may be applied onto the distinct layer 37 of white ink 36 (reference numeral 708 in FIG. 1 and FIG. 8C). It is to be understood that the thickness of the layer 10' may be any suitable thickness for the layer or part that is to be formed.

After applying the other layer 10' of the build material 16, the other layer 10' of the build material 16 may be pre-heated. Pre-heating the other layer 10' of the build material 16 may be accomplished using any suitable heat source that exposes all of the build material 16 in the fabrication bed 22 to the heat. Examples of the heat source include a thermal heat source or an electromagnetic radiation source (e.g., infrared (IR), microwave, etc.).

Figure 8D:
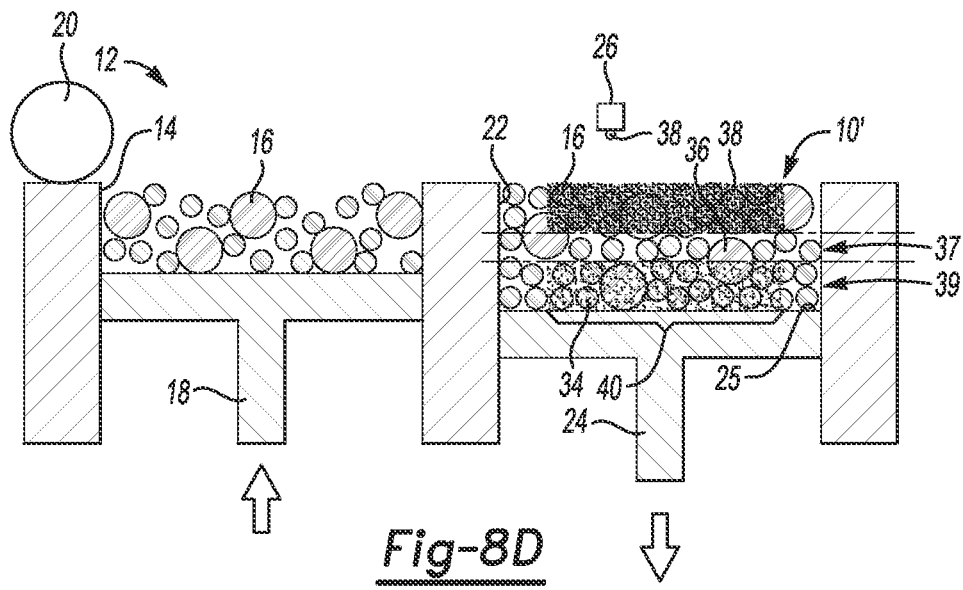

After pre-heating the other layer 10', the black ink 38 is selectively applied on at least a portion 40 of the other layer 10' of the build material 16, as shown at reference number 710 in FIG. 7 and in FIG. 8D. As illustrated in FIG. 8D, the black ink 38 may be dispensed from the inkjet printhead 26. It is to be understood that the printhead 26 selectively applies the black ink 38 on those portion(s) 40 of the other layer 10' of the build material 16 that are to be fused to become, e.g., a first layer of the 3D part. The black ink 38 may penetrate through the layer 10' as previously described, and may come into contact with the white ink 36 and the build material 16 of the sacrificial layer 32.

After the black ink 38 is selectively applied on the specific portion(s) of the other layer 10' of the build material 16, the entire other layer 10' of the build material 16 is exposed to radiation R. This is shown at reference numeral 712 of FIG. 7 and in FIG. 8E.

The radiation R is emitted from the radiation source 30 in a similar manner as previously described. The black ink 38 enhances the absorption of the radiation R, converts the absorbed radiation to thermal energy, and promotes the transfer of the thermal heat to the build material 16 in contact therewith. In an example, the black ink 38 sufficiently elevates the temperature of the build material 16 (in the layer 10') above the melting point(s), allowing curing (e.g., sintering, binding, fusing, etc.) of the build material particles to take place.

It is to be understood that the generated thermal energy may propagate into the surrounding build material 16 of the sacrificial layer 32, which does not have black ink 38 directly applied thereto, but rather has the white ink 36 and the colored ink 34 applied thereto. The propagation of thermal energy may cause at least some of the build material 16 in contact with the white colorant from the white ink 36 and at least some of the build material 16 in contact with the colorant from the colored ink 34 to at least partially fuse. As a result, the colorants of the white ink 36 and the colored ink 34 may become embedded in these at least partially fused portions of the sacrificial layer 32. Since, in this example method 700, the colored and white inks 34, 36 are sequentially applied under the black ink 38, the embedded colored ink 34 colorant is at the outermost bottom surface of the formed layer 45, and thus the resulting layer 45 appears colored (denoted in part by the light speckles at the bottom surface of layer 45 in FIG. 8E).

Figure 8E:
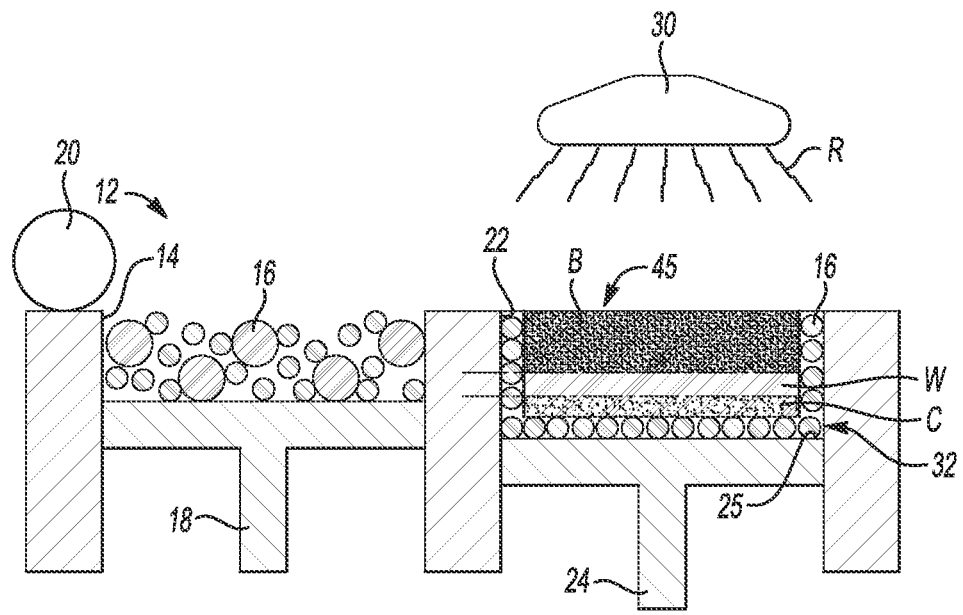

After exposure to radiation, the unfused portion of the sacrificial layer 32 may be removed from the layer 45 shown in FIG. 8E.

In one example, after the layer 45 is formed, additional layer(s) may be formed thereon to create an example of the 3D part. For example, to form one additional layer, another layer of build material 16 may be applied on the layer 45, and then reference numerals 304 through 308 of the method 300 (FIG. 3) may be performed. Reference numerals 304 through 308 may be repeated with subsequently applied build material 16 layers until an outermost layer of the build material 16 is applied, pre-heated, exposed to the black ink 38, and fused. In other words, reference numerals 304 through 308 may be repeated with subsequently applied build material 16 layers until the desired number of fused layers (being black in color) of the 3D part is formed.

After the top/outmost layer is formed in this example, the white ink 36 and colored ink 34 may be sequentially applied (using printheads 26', 26") to any of the exposed surfaces(s) (e.g., top/outermost surface(s) and/or side(s)) of the fused layers, including layer 45).

It is to be understood that the exposure to radiation R of each of the fused layers leaves at least partially fused build material attached at the surface(s) and/or side(s). When the white ink 36 and colored ink 34 are applied to the surface(s), the respective inks 36, 34 infuse among the at least partially fused particles to form the white portions W and the colored portions C at these surface(s). This forms an example of the colored 3D part on the layer 45.

In another example, after the layer 45 is formed, additional layer(s) may be formed thereon to create an example of the 3D part. For example, to form one additional layer, another layer of build material 16 may be applied on the layer 45, and then reference numerals 304 through 308 of the method 300 (FIG. 3) may be performed. Reference numerals 304 through 308 may be repeated with subsequently applied build material 16 layers until a penultimate layer of the 3D part is formed. The penultimate layer is then-currently the outermost layer of the part in production, but an additional layer of build material 16 may be applied thereto in order to form and color the top/outermost surface of the part.

After the outermost layer of build material 16 is applied to the penultimate layer, the actions at reference numerals 104 through 112 of the method 100 of FIG. 1 may be performed. This will form and color the outermost layer of the part. If it is desirable to also color the side(s), white ink 36 and colored ink 34 may be applied in a similar manner (previously described in reference to FIG. 1) to color the side(s) 42. This forms another example of the colored 3D part on the layer 45.

When this example of the 3D part is complete, it may be removed from the fabrication bed 22, and any uncured build material 16 may be removed from the 3D part.

To further illustrate the present disclosure, examples are given herein. It is to be understood that these examples are provided for illustrative purposes and are not to be construed as limiting the scope of the present disclosure.

EXAMPLES

Example 1—Milling Effect on White Pigment Concentrate

Several examples of the white pigment concentrate were prepared to determine the effect, if any, that milling time has on the visible absorbance of the white concentrate.

Ten different white pigment concentrates were prepared. Each of the pigment concentrates was prepared by milling white TI-PURE® R706 pigment (from DuPont) in water at about 52.7 wt %, in the presence of CARBOSPERSE® K7028 (0.5 wt % with respect to the pigment wt %) and DISPERBYK®-190 (0.8 wt % with respect to the pigment wt %). The milling time for each of the ten white pigment concentrates was different. The milling times were as follows: 60 minutes (conc. 1 and conc. 6), 90 minutes (conc. 2 and conc. 7), 120 minutes (conc. 3 and conc. 8), 180 minutes (conc. 4 and conc. 9), and 240 minutes (conc. 5 and conc. 10). The pH of five of the pigment concentrates (i.e., conc. 6-10) was adjusted to about 7, and the pH of the other five pigment concentrates (i.e., conc. 1-5) was adjusted to about 9.

Figure 9:
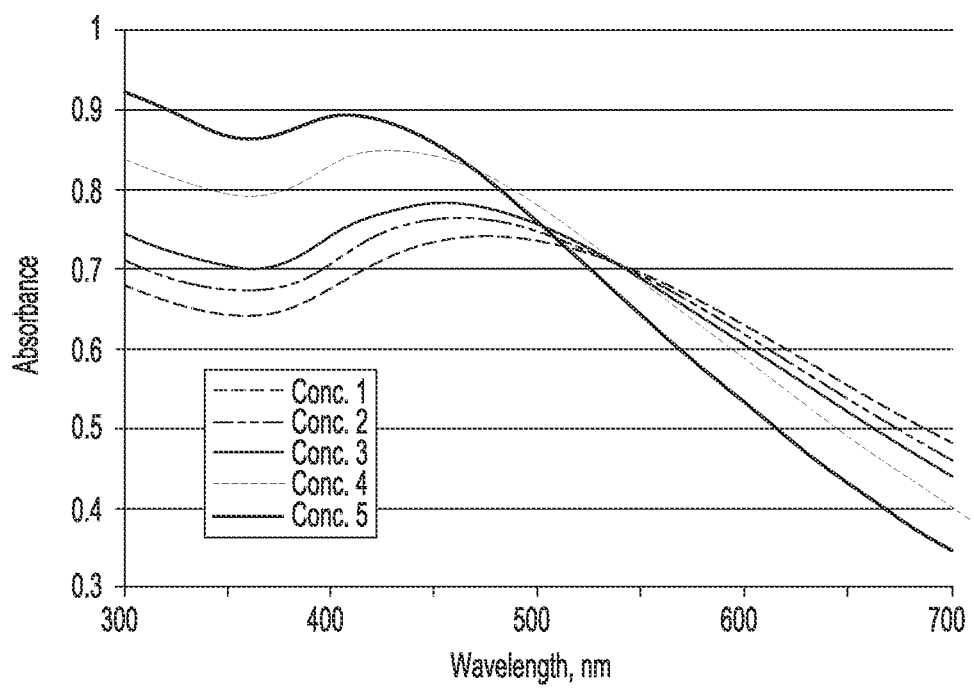
FIG. 9 is a graph depicting the wavelength versus absorbance results for white pigment concentrate examples 1-5 (having pH=9)
Figure 10:
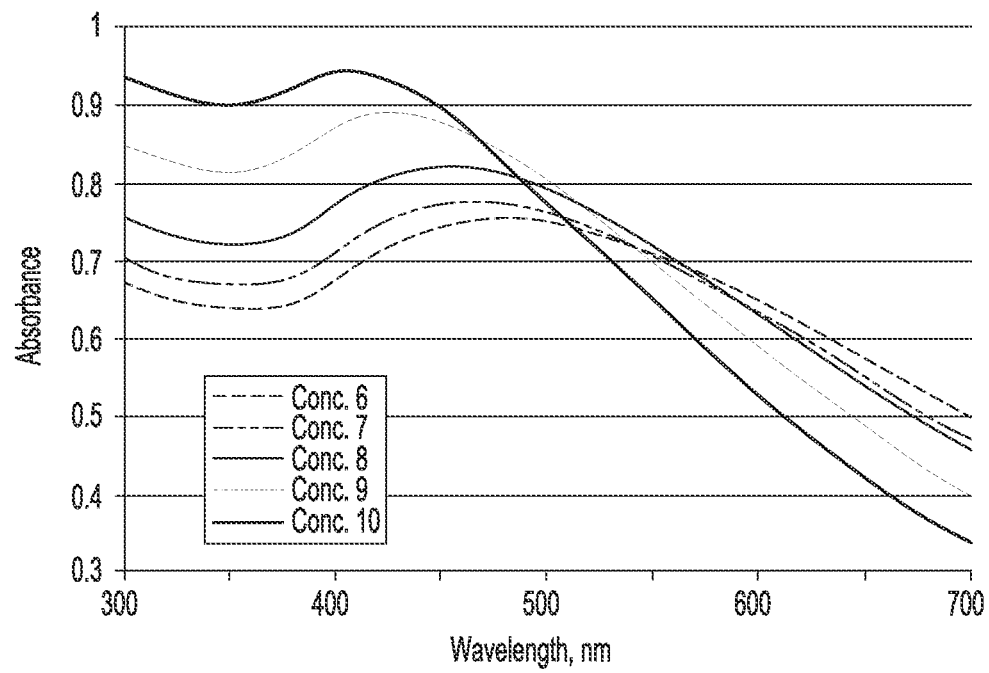
FIG. 10 is a graph depicting the wavelength versus absorbance results for white pigment concentrate examples 6-10 (having pH=7)

Each of the white pigment concentrates 1-10 was diluted with water at a ratio of 1:5,000, and the optical absorbance, across the visible spectrum, of the diluted white pigment concentrates was tested using an Agilent 8453 UV/Vis spectrometer. FIG. 9 shows the absorbance results for pigment concentrates 1-5 and FIG. 10 shows the absorbance results for pigment concentrates 6-10. As respectively depicted in FIGS. 9 and 10, the milling time of the white pigment concentrate had little effect on the absorbance of the concentrates 1-5 and 6-10 at 500 nm, which is the wavelength of maximum sensitivity for the human eye. Additionally, regardless of the milling time used, the absorbance of the concentrates 1-10 as the wavelength approached the infrared range (starting at about 780 nm) was significantly reduced. As such, any milling time may be used to formulate the white pigment concentrate (which is absorbing in the visible range and transparent in the infrared range) for the white inks disclosed herein.

Figure 11:
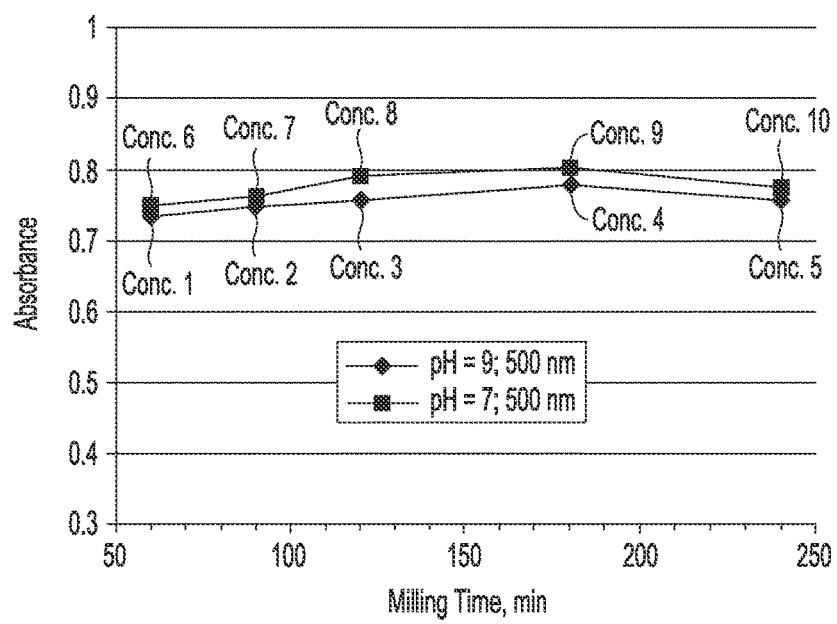
FIG. 11 is a graph depicting the milling time versus absorbance for the white concentrate examples 1-10.

FIG. 11 depicts the measured absorbance of the pigment concentrates (1-10) at 500 nm versus the milling time of the white pigment concentrates 1-10.

Concentrates 1-5 (pH=9) form one of the lines, and concentrates 6-10 (pH=7) form the other of the lines shown in FIG. 11. The results in FIG. 11 indicate that the opacity of the white pigment concentrates 1-10 at 500 nm is relatively consistent, regardless of the milling time of the white pigment concentrate.

Example 2—Test of White/Black Ink Combination Versus IR Dyes

Several black ink patches were printed on HP Advanced Photo Paper (from Hewlett Packard) with a DESKJET® 6540 printer and printhead HP96.

A white ink was formulated in accordance with Table 1 below.

TABLE 1

WHITE INK

| Ink Components | Wt % |
|---|---|
| 2-pyrrolidinone | 20.00 |
| CRODAFOS ® O3A | 0.50 |
| SURFYNOL ® SEF | 0.75 |
| CAPSTONE ® FS-35 | 0.05 |
| TRILON ® M | 0.04 |
| PROXEL ® GXL | 0.18 |
| KORDEK ® MLX | 0.14 |
| TI-PURE ® R706 white pigment concentrate | 20.00 |
| Deionized Water | balance |

The white TI-PURE® R706 pigment (from DuPont) was milled in water at about 52.7 wt %, in the presence of CARBOSPERSE® K7028 (0.5 wt % with respect to the pigment wt %) and DISPERBYK®-190 (0.8 wt % with respect to the pigment wt %) to form a pigment concentrate. The remaining white ink components shown in Table 1 were mixed together with a balance of water. The white pigment concentrate was then added to the mixture of the remaining ink components under constant stirring until the white pigment concentration was 20 wt %. The pH of the white ink was then adjusted to 8.0.

The white ink was then over-coated on the black ink patches at variable coating levels using Mayer rods (#7, #10, #15, #20, and #30). The white ink levels were equivalent to 125 picoliters/300 dpi with Mayer rod #7, 175 picoliters/300 dpi with Mayer rod #10, 260 picoliters/300 dpi with Mayer rod #15, 350 picoliters/300 dpi with Mayer rod #20, and 530 picoliters/300 dpi with Mayer rod #30.

Two comparative inks were prepared as well. The comparative ink formulations are shown in Table 2. Comparative ink patches were also printed on the HP Advanced Photo Paper (from Hewlett Packard) with a DESKJET® 6540 printer using the two comparative inks.

TABLE 2

| Ink Components | Comp. Ink 1 Wt % | Comp. Ink 2 Wt % |
|---|---|---|
| 2-pyrrolidinone | 20.00 | 20.00 |
| CRODAFOS ® O3A | 0.50 | 0.50 |
| SURFYNOL ® SEF | 0.75 | 0.75 |
| CAPSTONE ® FS-35 | 0.05 | 0.05 |
| CARBOSPERSE ® K 7028 | 0.01 | 0.01 |
| TRILON ® M | 0.04 | 0.04 |
| PROXEL ® GXL | 0.18 | 0.18 |
| KORDEK ® MLX | 0.14 | 0.14 |
| NIR #1 (FHI 104422P dye from Fabricolor) | 4.00 | — |
| NIR #2 (D12-005 pigment from Yamamoto Chemicals) | — | 4.00 |
| Deionized Water | balance | balance |

Figure 12:
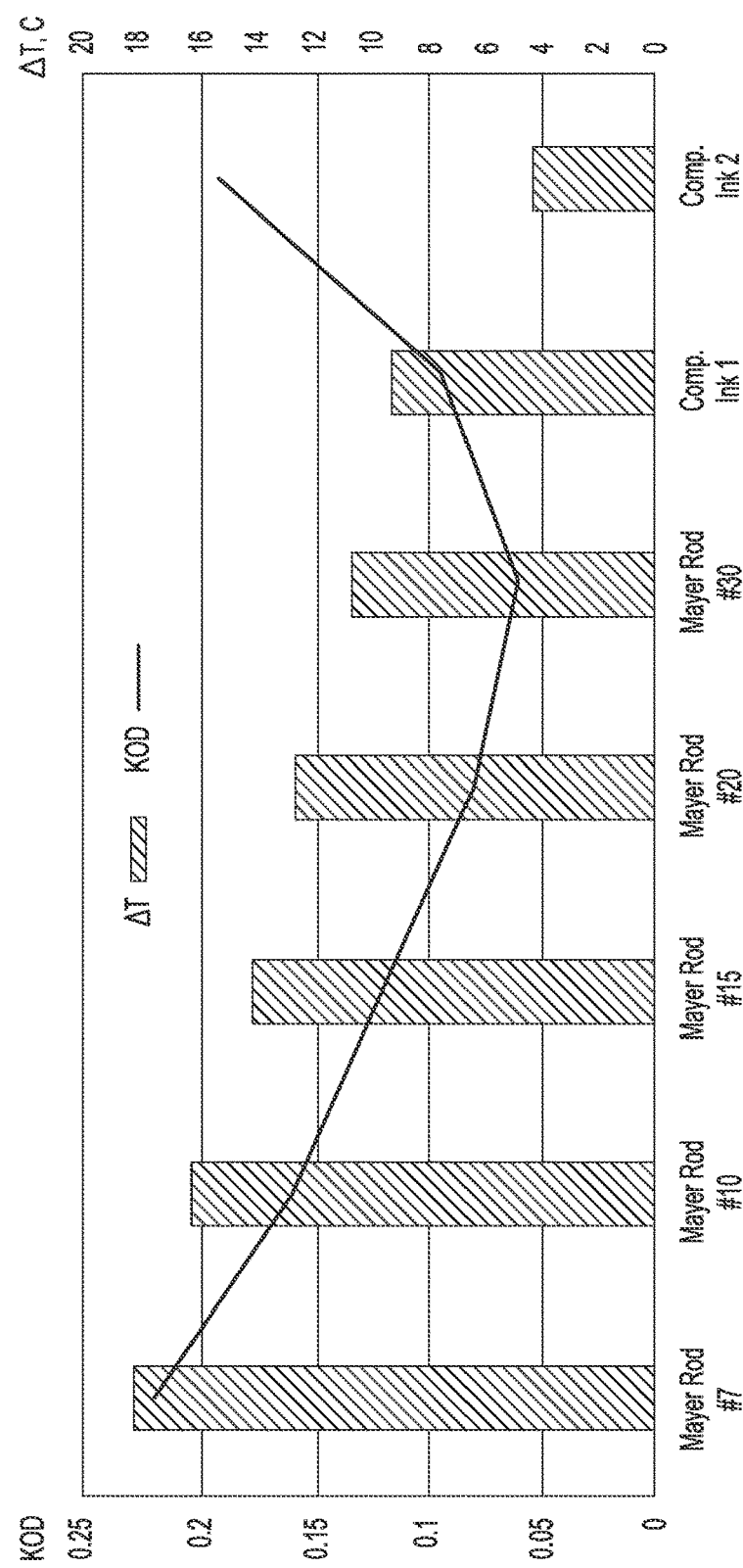
FIG. 12 is a graph depicting black optical density (KOD) and heat generation results for white-black ink combination patches and comparative ink patches.

The white-black ink combination patches and the comparative ink patches were tested for black optical density (KOD) and heat generation. Black optical density is the visual optical density of the patches. The KOD of a control sample was also taken. The control was a black patch with no white ink applied thereon. The KOD of the control was about 1.7. As can be seen in FIG. 12, the KOD of all of the white-black ink combination patches and the comparative ink patches were well below 1.7.

Heat generation was tested by exposed the white-black ink combination patches and the comparative ink patches to a halogen lamp (50 wt, 550 lumens) and using an IR thermometer to record the temperature at the surface of the white-black ink combination patches and the comparative ink patches. During heating, the distance between the halogen lamp and the respective patches was 30 cm.

$\Delta T$ was determined by the following equation: $\Delta T = T_{sample} - T_{media}$, where the $T_{sample}$ was the steady state temperature in the middle of the white-black ink combination patch or the comparative ink patch after being exposed to the halogen lamp, and $T_{media}$ was the temperature in the same point of the media before the white-black ink combination patch or the comparative ink patch was printed or applied thereon. $T_{sample}$ for both the white-black ink combination patches and the comparative ink patches were measured in the steady state (i.e., about 15 minutes after the respective patches were formed on the paper).

FIG. 12 is a graph depicting the black optical density (KOD) and the $\Delta T$ for the various white-black ink combination patches (identified by the Mayer rod used to apply the white ink) and the comparative ink patches (identified by the dye used). As depicted in FIG. 12, the comparative ink patches had much lower heat generation than any of the white-black ink combination patches and had comparable KOD values that are much lower than the control black ink patch KOD value. The KOD values of the white-black ink combination patches indicate that the white ink forms a suitable mask over the black ink. The $\Delta T$ values indicate that the white-black ink combinations will generate heat that is suitable for fusing the build material during examples of the 3D printing method disclosed herein, whereas the IR dye based inks will not generate heat suitable for fusing during 3D printing (which leads to 3D parts with reduced mechanical integrity and having non-uniform mechanical properties).

Example 3—3D Printing and Adding Color to a Part Side

A layer of polyamide-12 (PA-12) build material was applied to a fabrication bed and was pre-heated to 150° C. A carbon black ink was used as the fusing agent. The formula of the carbon black ink is shown in Table 4 of Example 4. The carbon black ink was thermal inkjet printed with a 9 ng printhead in a pattern on the PA-12 layer. The white ink of Example 2 was thermal inkjet printed with a 12 ng printhead on a side of the build material adjacent to the carbon black ink, and a cyan ink was thermal inkjet printed with a 12 ng printhead adjacent to the white ink. The formulation of the cyan ink is shown in Table 3.

TABLE 3

CYAN INK

| Ink Components | Wt % |
|---|---|
| 1,6-hexanediol | 9.0 |
| 1-(2-hydroxyethyl)-2-pyrrolidinone | 9.0 |
| 2-pyrrolidinone | 5.0 |
| EDTA-Na | 0.1 |
| 3-propanesulfonic acid (MOPS buffer) | 0.18 |
| CRODAFOS ® N-3 | 0.38 |
| SURFYNOL ® CT 211 | 0.16 |
| POLYFOX ® PF-154N | 0.80 |
| DOWFAX ® 2A1 | 0.32 |
| PROXEL ® GXL | 0.1 |
| C854-Na Cyan Dye (Fuji Film) | 3.27 |
| Deionized Water | balance |

The PA-12 (with the applied carbon black ink, white ink, and cyan ink) was subjected to selective fusion with two 300

W halogen light bulbs (total of 600 W) using a prototype Multi jet Fusion™ Machine (Hewlett-Packard), and a solidified part was formed.

Figure 13:
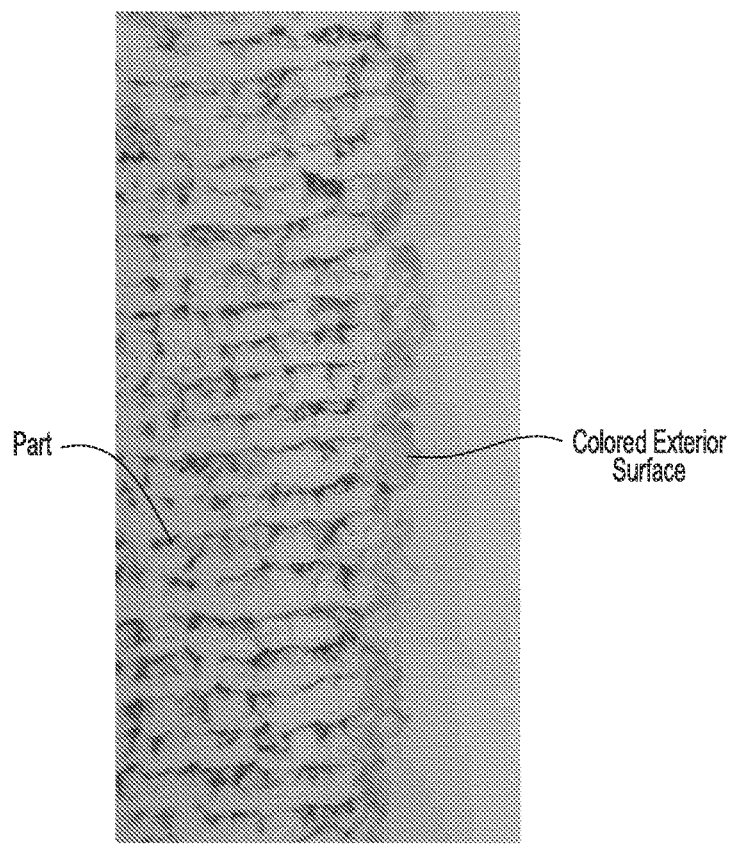
FIG. 13 is an optical microscope image of a side portion of an example 3D part formed from an example of the method disclosed herein.

An optical microscope image of a portion of the part side was taken, and is shown in FIG. 13. The results clearly illustrate the solidified part and the white and cyan pigments from the respective inks at the side surface of the part. After fusing, the white and cyan pigments become embedded into the at least partially fused build material that is adjacent the solidified build material to create a colored exterior surface.

Example 4—Comparison of 3D Printed Parts

Two ink formulations were made: a sample black ink containing 5% of carbon black, and a comparative ink containing 5% of an infrared dye. The ink formulations are shown in Table 4.

TABLE 4

| Ink components | black ink wt % | IR ink wt % |
|---|---|---|
| 2-Pyrrolidinone | 20.00 | 20.00 |
| CRODAFOS ® O3A | 0.50 | 0.50 |
| SURFYNOL ® SEF | 0.75 | 0.75 |
| CAPSTONE ® FS-35 | 0.05 | 0.05 |
| CARBOSPERSE ® K7028 | 0.01 | 0.01 |
| TRILON ® M | 0.04 | 0.04 |
| PROXEL ® GXL | 0.18 | 0.18 |
| KORDEK ® MLX | 0.14 | 0.14 |
| CABOJET ® 300 carbon black pigment (Cabot Corp.) | 5.00 | 0.00 |
| FABRICOLOR ® FHI 104422P IR colorant (Fabricolor Holding Int'l LLC) | 0.00 | 5.00 |

For the sample part, a Vestosint 1556 Nylon 12 powder (manufactured by Evonik) was applied to a fabrication bed and was pre-heated. The sample black ink was printed on the powder. The black ink coated powder was subjected to selective fusion with a 300 W halogen light bulb using a prototype Multi jet Fusion™ Machine (Hewlett Packard). After fusing, the white ink of Example 2 was printed on the fused example part.

For the comparative sample part, the Vestosint 1556 Nylon 12 powder (manufactured by Evonik) was applied to a fabrication bed and was pre-heated. The comparative IR ink was printed on the powder. The comparative IR ink coated powder was subjected to selective fusion with a 300 W halogen light bulb using a prototype Multijet Fusion Machine. After fusing, the white ink of Example 2 was printed on the fused comparative example part.

The selective fusion conditions were the same for the example part and the comparative example part.

Each of the example part and the comparative example part was manufactured as a Type 5 (or Type V) Tensile Test specimen (American Society for Testing and Materials (ASTM) standard) and was analyzed.

The example part was white in color, while the comparative example part was light green. The comparative example part had a density 0.7 g/cm$^3$ and the example part had a density of 1.04 g/cm$^3$. The lower density of the comparative example part indicated that the part was brittle. The brittleness of the comparative example part was confirmed when both parts were exposed to a 90° bend. The comparative example part broke, while the example part did not break.

Additionally, it was observed that bending the example part did not produce delamination of the white pigment coating. This may be due to the white pigment being fused into the nylon part.

The example part was also stable to rub and scratch resistance by a human nail. In contrast, the comparative example part tended to crumble and could not withstand the scratch by the human nail.

Example 5—Color Coordinates of 3D Printed Patches

A layer of polyamide-12 (PA-12) build material was applied to a fabrication bed and was pre-heated 150° C. The carbon black ink (Table 4) was used as the fusing agent. The carbon black ink was thermal inkjet printed with a 9 ng printhead in a pattern on the PA-12 layer. The PA-12 (with carbon black ink applied thereto) was subjected to selective fusion with a 300 W halogen light bulb using a prototype Multi jet Fusion™ Machine (Hewlett Packard). Three different parts were formed via this process.

The white ink of Example 2 was thermal inkjet printed with a 9 ng printhead on each of the three different parts. For one of the parts, the cyan ink (Table 3) was thermal inkjet printed with a 9 ng printhead on 5 separate patches of the white ink (C2-C6) and a control patch (C1) had no cyan ink printed thereon. For a second of the parts, yellow ink (Table 5) was thermal inkjet printed with a 9 ng printhead on 5 patches of the white ink (Y2-Y6) and a control patch (Y1) had no yellow ink printed thereon. For the third of the parts, magenta ink (Table 5) was thermal inkjet printed with a 9 ng printhead on 5 patches of the white ink (M2-M6) and a control patch (M1) has no magenta ink printed thereon. For each patch having color (C2-C6, Y2-Y6, and M2-M6), the amount of the respective ink that was deposited was incrementally increased. As such C2, Y2, and M2 had the least amount of colored ink and C6, Y6, and M6 had the most amount of colored ink.

TABLE 5

| Ink Components | Magenta Ink Wt % | Yellow Ink Wt % |
|---|---|---|
| 1,6-hexanediol | 9.0 | 9.0 |
| 1-(2-hydroxyethyl)-2-pyrrolidinone | 9.0 | 9.0 |
| 2-pyrrolidinone | 5.0 | 5.0 |
| EDTA-Na | 0.10 | 0.10 |
| 3-propanesulfonic acid (MOPS buffer) | 0.18 | 0.008 |
| CRODAFOS ® N-3 | 0.25 | 0.25 |
| SURFYNOL ® CT 211 | 0.16 | 0.16 |
| POLYFOX ® PF-154N | 0.80 | 0.80 |
| DOWFAX ® 2A1 | 0.32 | 0.32 |
| PROXEL ® GXL | 0.10 | 0.10 |
| HMI-Na Magenta dye (Nippon Kayaku) | 1.84 | — |
| M377 (Ilford magenta dye) | 1.43 | — |
| AR52-Na (Sensient magenta Dye) | 0.48 | — |
| Y1189-Na (Ilford yellow Dye) | — | 4.58 |
| AY17-Na (Sensient yellow Dye) | — | 0.50 |
| Deionized Water | balance | balance |

Several color coordinates (lightness L*, color channels a* (red/green coordinate) and b* (yellow/blue coordinate), and chroma C*) were measured for each of the patches. The results are shown in Table 6.

TABLE 6

| Patch ID | L* | a* | b* | C* |
|---|---|---|---|---|
| C1 (control) | 76 | −6 | −9 | 11 |
| C2 | 69 | −16 | −18 | 24 |
| C3 | 68 | −19 | −21 | 28 |
| C4 | 63 | −25 | −27 | 36 |

TABLE 6-continued

| Patch ID | L* | a* | b* | C* |
|---|---|---|---|---|
| C5 | 65 | −21 | −23 | 31 |
| C6 | 62 | −26 | −29 | 39 |
| Y1 (control) | 79 | −8 | 8 | 12 |
| Y2 | 77 | −6 | 31 | 32 |
| Y3 | 74 | −4 | 41 | 41 |
| Y4 | 75 | −2 | 43 | 43 |
| Y5 | 74 | −4 | 37 | 38 |
| Y6 | 73 | 0 | 45 | 45 |
| M1 (control) | 84 | −3 | −6 | 7 |
| M2 | 68 | 19 | −11 | 22 |
| M3 | 56 | 32 | −14 | 35 |
| M4 | 44 | 45 | −11 | 46 |
| M5 | 48 | 44 | −11 | 45 |
| M6 | 46 | 39 | −12 | 41 |

As illustrated in Table 6, chroma increased as more ink was deposited. In other words, the chroma steadily increased from C1 to C6, Y1 to Y6, and M1 to M6. This illustrates that the white does mask the black, and that color improvement of a 3D part may be achieved using the examples disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50° C. to about 400° C. should be interpreted to include not only the explicitly recited limits of about 50° C. to about 400° C., but also to include individual values, such as 57° C., 95° C., 225° C., 350° C., etc., and sub-ranges, such as from about 70° C. to about 325° C., from about 60° C. to about 170° C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for adding color to a part during three-dimensional printing, comprising:
applying a build material;
pre-heating the build material to a temperature ranging from about 50° C. to about 400° C.;
selectively applying a black ink including an infrared absorbing colorant on at least a portion of the build material;
selectively applying a white ink on the applied black ink, the white ink including a white colorant that is opaque in visible wavelengths and is transparent to infrared wavelengths;
selectively applying a colored ink on the applied white ink, the colored ink including a colorant having a color other than black or white; and
then exposing the build material and the applied black, white, and colored inks to infrared radiation, whereby the black ink at least partially fuses the portion of the build material in contact therewith, and at least some of the white colorant and at least some of the colorant are embedded in the at least partially fused portion at a surface thereof.

2. The method as defined in claim 1 wherein the build material is applied to an outer surface of a part precursor.

3. The method as defined in claim 2 wherein prior to applying the build material, the method further comprises building the part precursor by:
applying a first layer of the build material;
pre-heating the first layer of the build material to a temperature ranging from about 50° C. to about 400° C.;
selectively applying the black ink on at least a portion of the first layer of the build material;
exposing the first layer of the build material and the applied black ink to infrared radiation, whereby the black ink at least partially fuses the portion of the first layer of the build material to form a first part layer;
applying a second layer of the build material on at least a portion of the first part layer;
repeating the pre-heating, the selectively applying, and the exposing with the second layer of the build material to form a second part layer; and
repeating the applying, the pre-heating, the selectively applying, and the exposing with subsequent layers of the build material until the part precursor is formed.

4. The method as defined in claim 1 wherein the white ink includes:
a white pigment present in an amount ranging from about 10 wt % to about 60 wt % of a total wt % of the white ink;
a dispersant present in an amount ranging from about 0.2 wt % to about 3.0 wt % of a total wt % of the white pigment;
a co-solvent present in an amount ranging from about 10 wt % to about 30 wt % of the total wt % of the white ink; and
a balance of water; and
optionally an acrylic binder latex, an anti-kogation agent, a biocide, or combinations thereof.

5. The method as defined in claim 1 wherein the exposing forms at least a portion of the part having a side, and wherein the method further comprises:
adding the color to the side by:
selectively applying the white ink on the side; and
selectively applying the colored ink on the white ink applied on the side.

6. A method for adding color to a part during three-dimensional printing, comprising:
applying a sacrificial layer of a build material;
selectively applying a colored ink on at least a portion of the sacrificial layer, the colored ink including a colorant having a color other than black or white;
selectively applying a white ink on the applied colored ink, the white ink including a white colorant that is opaque in visible wavelengths and is transparent to infrared wavelengths;
applying a layer of the build material on the applied white ink;
pre-heating the layer of the build material to a temperature ranging from about 50° C. to about 400° C.;

selectively applying a black ink including an infrared absorbing colorant on at least a portion of the layer of the build material; and exposing the layer of the build material, the applied black, white, and colored inks, and the sacrificial layer to infrared radiation, whereby the black ink at least partially fuses the portion of the layer of the build material in contact therewith and at least partially fuses a portion of the sacrificial layer to embed the white colorant and the colorant at a surface of the at least partially fused portion of the layer of the build material.

7. The method as defined in claim 6, further comprising removing an unfused portion of the sacrificial layer.

8. The method as defined in claim 6 wherein the exposing forms a first layer of the part, and wherein the method further comprises:

applying a second layer of the build material to at least a portion of the first layer of the part;

pre-heating the second layer of the build material to a temperature ranging from about 50° C. to about 400° C.;

selectively applying the black ink on at least a portion of the second layer of the build material; and exposing the second layer of the build material and the applied black ink to infrared radiation, whereby the black ink at least partially fuses the portion of the second layer of the build material to form a second layer of the part.

9. The method as defined in claim 8, further comprising coloring a side surface of the second layer of the part by:

selectively applying the white ink on the side surface, thereby infusing the white colorant into partially fused build material at the side surface; and selectively applying the colored ink on the white ink, thereby infusing the colorant into an outermost portion of the partially fused build material at the side surface.

10. The method as defined in claim 8, further comprising repeating the applying, the pre-heating, the selectively applying, and the exposing with subsequent layers of the build material until the part is formed.

11. The method as defined in claim 10, further comprising coloring a top surface of the part by:

applying an outermost layer of the build material to at least a portion of an outermost fused layer of the part;

pre-heating the outermost layer of the build material to a temperature ranging from about 50° C. to about 400° C.;

selectively applying the black ink on at least a portion of the outermost layer the build material;

selectively applying the white ink on the black ink;

selectively applying the colored ink on the white ink; and exposing the outermost layer of the build material, the black ink, the white ink, and the colored ink to infrared radiation.

12. The method as defined in claim 6 wherein the white ink includes:

a white pigment present in an amount ranging from about 10 wt % to about 60 wt % of a total wt % of the white ink;

a dispersant present in an amount ranging from about 0.2 wt % to about 3.0 wt % of the total wt % of the white pigment;

a co-solvent present in an amount ranging from about 10 wt % to about 30 wt % of the total wt % of the white ink; and a balance of water; and optionally an acrylic binder latex, an anti-kogation agent, a biocide, or combinations thereof.

13. A method for adding color to a part during three-dimensional (3D) printing, comprising:

applying a build material, wherein the build material has an original material density and an after fusing density that is within 10% of the original material density;

pre-heating the build material to a temperature ranging from about 50° C. to about 400° C.;

selectively applying a black ink including an infrared absorbing colorant on at least a portion of the build material;

exposing the build material and the applied black ink to infrared radiation, whereby the black ink at least partially fuses the portion of the build material in contact therewith to form a part layer;

selectively applying a white ink on at least a portion of a surface of the part layer; and selectively applying a colored ink on the applied white ink, the colored ink including a colorant having a color other than black or white.

14. The method as defined in claim 13 wherein the surface of the part layer is selected from the group consisting of a top surface, a side surface, and combinations thereof.

15. The method as defined in claim 13 wherein:

prior to the selectively applying of the white ink and the colored ink, the method further comprises repeating the applying, the pre-heating, the selectively applying of the black ink, and the exposing with subsequent layers of the build material to form the part including multiple layers; and the white ink is selectively applied on at least a portion of a surface of each of the multiple layers.

* * * * *

UNITED STATES PATENT AND TRADEMARK OFFICE
CERTIFICATE OF CORRECTION

PATENT NO. : 10,434,709 B2
APPLICATION NO. : 15/547007
DATED : October 8, 2019
INVENTOR(S) : Alexey S. Kabalnov et al.

Page 1 of 1

It is certified that error appears in the above-identified patent and that said Letters Patent is hereby corrected as shown below:

On the Title Page

In Column 2, item (57), Abstract, Line 3, delete "50 C" and insert -- 50° C. --, therefor.

In Column 2, item (57), Abstract, Line 3, delete "400 C." and insert -- 400° C. --, therefor.

Signed and Sealed this
Fourth Day of February, 2020

Andrei Iancu
*Director of the United States Patent and Trademark Office*